United States Patent
Boyd et al.

(10) Patent No.: US 10,571,711 B2
(45) Date of Patent: Feb. 25, 2020

(54) BRIGHTNESS ENHANCEMENT FILM WITH SUBSTANTIALLY NON-IMAGING EMBEDDED DIFFUSER

(71) Applicant: 3M INNOVATIVE PROPERTIES COMPANY, St. Paul, MN (US)

(72) Inventors: Gary T. Boyd, Woodbury, MN (US); Qingbing Wang, Woodbury, MN (US); Tri Dinh Pham, Woodbury, MN (US); Connie L. Johnson, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 749 days.

(21) Appl. No.: 14/395,588

(22) PCT Filed: Apr. 12, 2013

(86) PCT No.: PCT/US2013/036291
§ 371 (c)(1),
(2) Date: Oct. 20, 2014

(87) PCT Pub. No.: WO2013/158475
PCT Pub. Date: Oct. 24, 2013

(65) Prior Publication Data
US 2015/0116833 A1    Apr. 30, 2015

Related U.S. Application Data

(60) Provisional application No. 61/636,424, filed on Apr. 20, 2012.

(51) Int. Cl.
*G02B 27/48* (2006.01)
*G02B 5/02* (2006.01)

(52) U.S. Cl.
CPC .......... *G02B 27/48* (2013.01); *G02B 5/0231* (2013.01)

(58) Field of Classification Search
CPC .... G02B 6/005; G02B 6/0051; G02B 6/0053; G02B 27/48; G02B 3/0043; G02B 3/005;
(Continued)

(56) References Cited

U.S. PATENT DOCUMENTS 6,025,897 A    2/2000 Weber
6,100,952 A    8/2000 Marvin
(Continued)

FOREIGN PATENT DOCUMENTS

JP    2005/327688 A    11/2005
JP    2006/220995 A    8/2006
(Continued)

OTHER PUBLICATIONS

U.S. Appl. No. 61/613,143, "Structured Optical Film", filed Jun. Mar. 20, 2012.
(Continued)

*Primary Examiner* — Marin Pichler
(74) *Attorney, Agent, or Firm* — Michael Stern

(57) ABSTRACT

A microreplicated optical film (919) for use in optical displays, backlights, and the like includes a prismatic layer (950) carried by a substrate (920). In use, the optical film may be combined in a system with other components such that the optical film is positioned between an extended light source (902) and a polarizer (904). In such cases, if the substrate has an appreciable birefringence, a subtle but characteristic colored pattern known as substrate color mura (SCM) may be detected by a user of the system. To reduce or eliminate the SCM with little or no adverse effect on brightness enhancement capabilities of the optical film, the optical film may include an embedded structured surface
(Continued)

(933) between the substrate and the prismatic layer. In order to avoid another optical artifact known as sparkle, at least 80% of the embedded structured surface is preferably occupied by features such as defocusing lenslets or random planar facets.

7 Claims, 18 Drawing Sheets

(58) Field of Classification Search
CPC .. G02B 3/0037; G02B 3/0056; G02B 5/0221; G02B 5/0231; G02B 5/0236; G02B 5/0242; G02B 5/045
See application file for complete search history.

(56) References Cited

U.S. PATENT DOCUMENTS

| | | | |
|---|---|---|---|
| 6,900,941 | B2 | 5/2005 | Kaminsky |
| 7,478,913 | B2 | 1/2009 | Epstein et al. |
| 7,618,164 | B2 | 11/2009 | Wang et al. |
| 7,697,206 | B2 | 4/2010 | Kogure |
| 7,777,832 | B2 | 8/2010 | Richard |
| 7,914,192 | B2 | 3/2011 | Coleman |
| 8,085,469 | B2 | 12/2011 | Lah |
| 2002/0141202 | A1 | 10/2002 | Liu |
| 2009/0097229 | A1 | 4/2009 | Wood |
| 2010/0002468 | A1 | 1/2010 | Liu et al. |
| 2010/0086743 | A1 | 4/2010 | Wang et al. |
| 2010/0302479 | A1 | 12/2010 | Aronson |
| 2011/0280004 | A1 | 11/2011 | Shimada et al. |

FOREIGN PATENT DOCUMENTS

| | | | | |
|---|---|---|---|---|
| JP | 2007/328314 A | 12/2007 | | |
| JP | WO 2010041656 A1 * | 4/2010 | ........... | G02B 3/0056 |
| TW | 201015159 A | 4/2010 | | |
| WO | WO 2005-119350 | 12/2005 | | |
| WO | WO 2006-046791 | 5/2006 | | |
| WO | WO 2010-120864 | 10/2010 | | |
| WO | WO 2010-141261 | 12/2010 | | |
| WO | WO 2011-088161 | 7/2011 | | |

OTHER PUBLICATIONS

Van Horn et al., "Conoscopic Measurement of Birefringence and Orientation in Biaxially Stretched Polymer Films and Sheets", Macromolecules 2003, vol. 36, pp. 8513-8521 (2003).

* cited by examiner

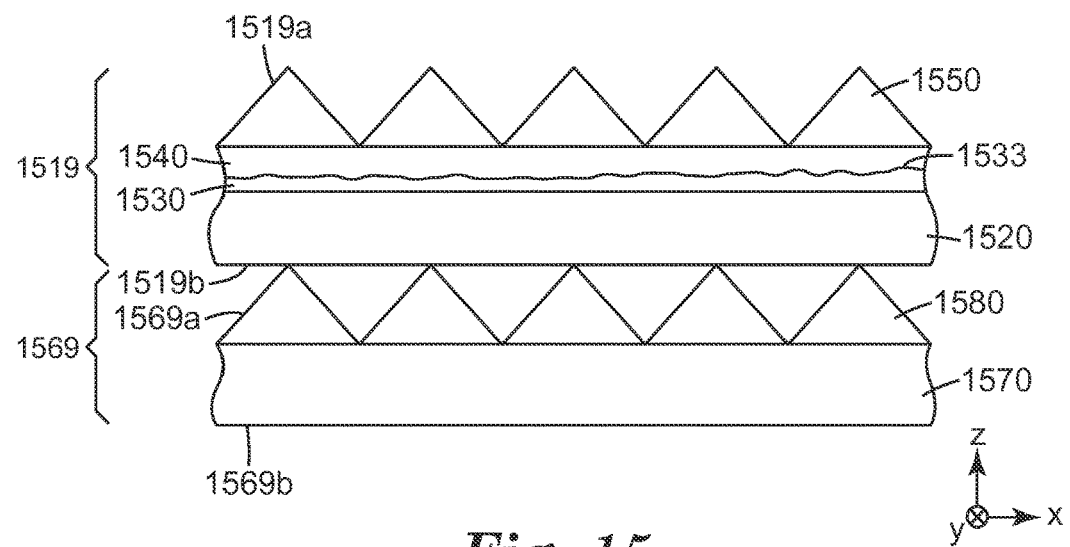
*Fig. 15*
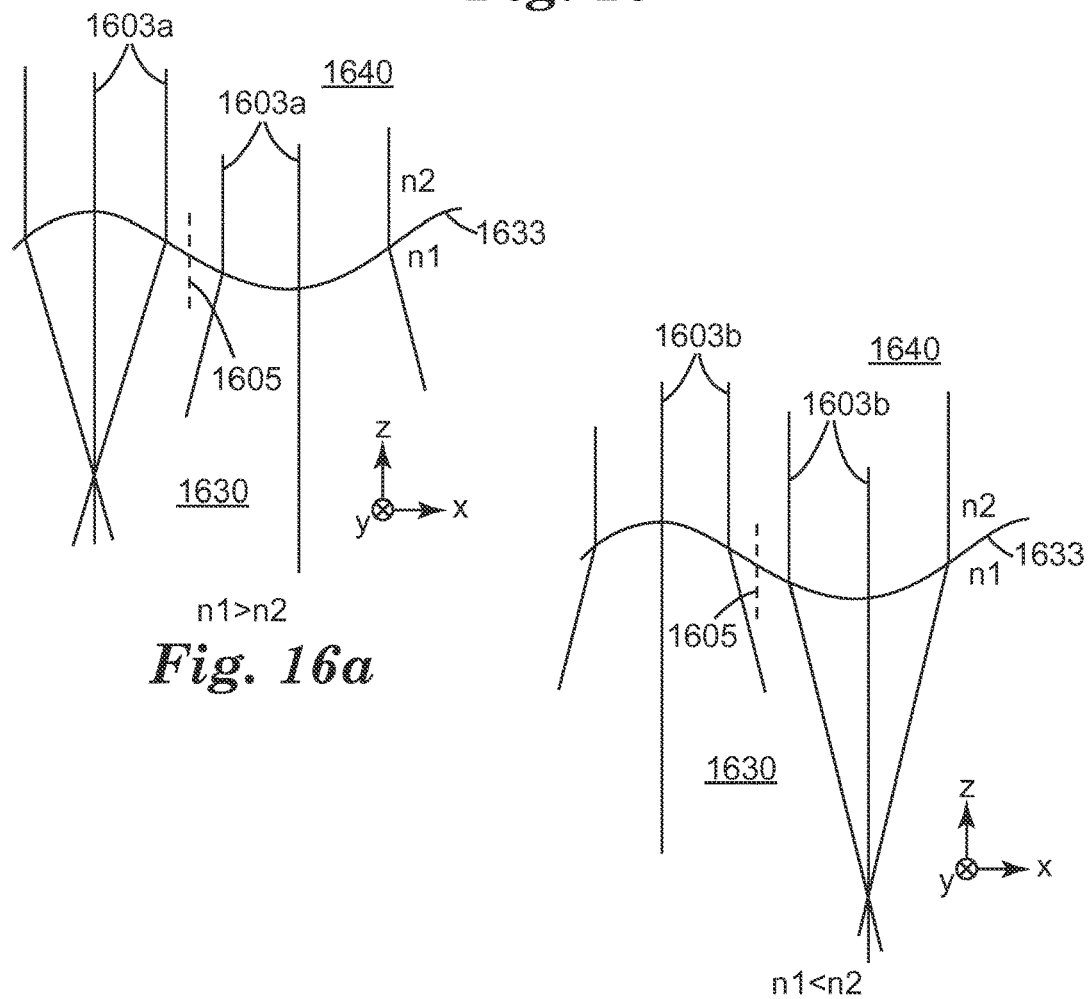
*Fig. 16a*
*Fig. 16b*

| Sample | Micro-structure type | Micro-structure EDC (um) | prism pitch (um) | Micro-structure index | prism index | delta n | SCM (Substrate Color Mura) hiding | Sparkle rating (with lower prism film) |
|---|---|---|---|---|---|---|---|---|
| 0 | (none) | N/A | 24 | N/A | 1.64 | N/A | Not Good | Not Good |
| 1 | Lenslet 1 | 38 | 24 | 1.5 | 1.56 | 0.06 | Not Good | Good |
| 2 | Lenslet 1 | 38 | 24 | 1.5 | 1.58 | 0.08 | Not Good | Good |
| 3 | Lenslet 1 | 38 | 24 | 1.5 | 1.64 | 0.14 | Not Good | Good |
| 4 | Lenslet 1 | 38 | 24 | 1.56 | 1.58 | 0.02 | Not Good | Good |
| 5 | Lenslet 1 | 38 | 24 | 1.56 | 1.64 | 0.08 | Not Good | Good |
| 6 | Lenslet 1 | 38 | 24 | 1.58 | 1.64 | 0.06 | Not Good | Good |
| 7 | Lenslet 2 | 33 | 24 | 1.5 | 1.56 | 0.06 | Not Good | Good |
| 8 | Lenslet 2 | 33 | 24 | 1.5 | 1.58 | 0.08 | Good | Good |
| 9 | Lenslet 2 | 33 | 24 | 1.5 | 1.64 | 0.14 | Best | Good |
| 10 | Lenslet 2 | 33 | 24 | 1.56 | 1.58 | 0.02 | Not Good | Good |
| 11 | Lenslet 2 | 33 | 24 | 1.56 | 1.64 | 0.08 | Good | Good |
| 12 | Lenslet 2 | 33 | 24 | 1.58 | 1.64 | 0.06 | Marginal | Good |
| 13 | Faceted | N/A | 24 | 1.5 | 1.56 | 0.06 | Marginal | Good |
| 14 | Faceted | N/A | 24 | 1.5 | 1.58 | 0.08 | Good | Good |
| 15 | Faceted | N/A | 24 | 1.5 | 1.64 | 0.14 | Best | Good |
| 16 | Faceted | N/A | 24 | 1.56 | 1.58 | 0.02 | Not Good | Good |
| 17 | Faceted | N/A | 24 | 1.56 | 1.64 | 0.08 | Good | Good |
| 18 | Faceted | N/A | 24 | 1.58 | 1.64 | 0.06 | Marginal | Good |

Fig. 23

BRIGHTNESS ENHANCEMENT FILM WITH SUBSTANTIALLY NON-IMAGING EMBEDDED DIFFUSER

FIELD OF THE INVENTION

This invention relates generally to microreplicated optical films, with particular application to such films that can be used for brightness enhancement purposes in displays.

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Most LCDs include a liquid crystal panel and an extended area light source, often referred to as a backlight, for illuminating the liquid crystal panel. Backlights typically include one or more lamps and a number of light management films such as, for example, light guides, mirror films, light redirecting films (including brightness enhancement films), retarder films, light polarizing films, and diffuser films. Diffuser films are typically included to hide optical defects and improve the brightness uniformity of the light emitted by the backlight.

BRIEF SUMMARY

Microreplicated optical films used for brightness enhancement purposes typically include a prismatic layer carried by a substrate. When such a film is used in an optical display, backlight, or similar system, it may be combined with other components such that the optical film is positioned between an extended light source and a polarizer. In such cases, if the substrate has an appreciable birefringence, a subtle but characteristic colored pattern known as substrate color mura (SCM) may be detected by a user of the system. To reduce or eliminate the SCM with little or no adverse effect on brightness enhancement capabilities of the optical film, the optical film may include an embedded structured surface between the substrate and the prismatic layer. Furthermore, in order to avoid another optical artifact known as sparkle, at least 80% of the embedded structured surface is preferably occupied by features such as defocusing lenslets or randomly oriented planar facets.

We have developed a family of microreplicated optical films that are configured to exhibit substantially reduced SCM, and little or no sparkle. Such reductions are possible with little or no adverse effect on brightness enhancement capabilities of the optical film, by providing the optical film with an embedded structured surface of suitable design. In some cases, a substantial majority, e.g. at least 80%, of the embedded structured surface is occupied by non-imaging features such as defocusing lenslets or randomly oriented planar facets.

The present application discloses, inter alia, optical films that include a birefringent substrate, a prismatic layer carried by the substrate, and an embedded structured surface disposed between the substrate and the prismatic layer. The prismatic layer has a major surface comprising a plurality of side by side linear prisms extending along a same first direction. The embedded structured surface may comprise a plurality of defocusing lenslets, the defocusing lenslets covering at least 80% of the embedded structured surface.

The prisms may have a same orientation in transverse cross section. The prisms may have a pitch P, and each lenslet may have an equivalent circular diameter ECD, the plurality of lenslets having an average equivalent circular diameter $ECD_{avg}$, and $ECD_{avg}$ may be greater than P. The embedded structured surface may separate two optical media that differ in refractive index by at least 0.05. The embedded structured surface may be an interface between the prismatic layer and an embedded layer, the embedded layer being disposed between the substrate and the prismatic layer. The refractive index of the prismatic layer may be greater than the refractive index of the embedded layer by at least 0.05, and each of the defocusing lenslets curves may be away from the prismatic layer.

The embedded structured surface may be an interface between a first and second embedded layer, and the first and second embedded layers may be disposed between the substrate and the prismatic layer. The refractive index of the first embedded layer may differ from the refractive index of the second embedded layer by at least 0.05.

The embedded structured surface may be configured such that the optical film exhibits an effective transmission (ET) of no less than 1.5, or no less than 1.6. The substrate may be a film of polyethylene terephthalate (PET). The substrate may include a major surface exposed to air, and the major surface of the substrate may be non-smooth.

The present application also discloses optical films that include a birefringent substrate, a prismatic layer carried by the substrate, and an embedded structured surface disposed between the substrate and the prismatic layer. The prismatic layer has a major surface comprising a plurality of side by side linear prisms extending along a same first direction. The embedded structured surface may comprise a plurality of randomly oriented substantially planar facets, the facets covering at least 80% of the embedded structured surface. The prisms may have a same orientation in transverse cross section.

The embedded structured surface may separate two optical media that differ in refractive index by at least 0.05. The embedded structured surface may be an interface between the prismatic layer and an embedded layer, the embedded layer being disposed between the substrate and the prismatic layer. The refractive index of the prismatic layer may be greater than the refractive index of the embedded layer by at least 0.05. The embedded structured surface may be an interface between a first and second embedded layer, the first and second embedded layers being disposed between the substrate and the prismatic layer. The refractive index of the first embedded layer may differ from a refractive index of the second embedded layer by at least 0.05.

The embedded structured surface may be configured such that the optical film exhibits an effective transmission of no less than 1.5, or no less than 1.6. The substrate may be a film of polyethylene terephthalate (PET). The substrate may include a major surface exposed to air, and the major surface of the substrate may be non-smooth.

Related methods, systems, and articles are also discussed. For example, backlights and displays incorporating the disclosed films are also disclosed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 5a depicts the CIE x color component and FIG. 5b depicts the CIE y color component;

FIG. 12 is a schematic side or sectional view of an optical system for measuring on-axis brightness of a microreplicated optical film such as that of FIG. 9a;

FIG. 15 is a schematic side or sectional view of a film stack including a microreplicated optical film disposed atop or adjacent to a second film, layer, or object that has a patterned major surface, this arrangement being susceptible to exhibiting an optical phenomenon or artifact known as "sparkle";

FIGS. 16a, 16b are schematic side or sectional views of a portion of the embedded undulating structured surface in the microreplicated optical film of FIG. 15, showing how different portions of the structured surface have focusing or imaging properties depending upon which optical medium that borders the structured surface has a greater index of refraction;

FIG. 23 is a table showing results of example microreplicated optical films that were fabricated and tested.

In the figures, like reference numerals designate like elements.

DETAILED DESCRIPTION OF ILLUSTRATIVE EMBODIMENTS

Figure 1:
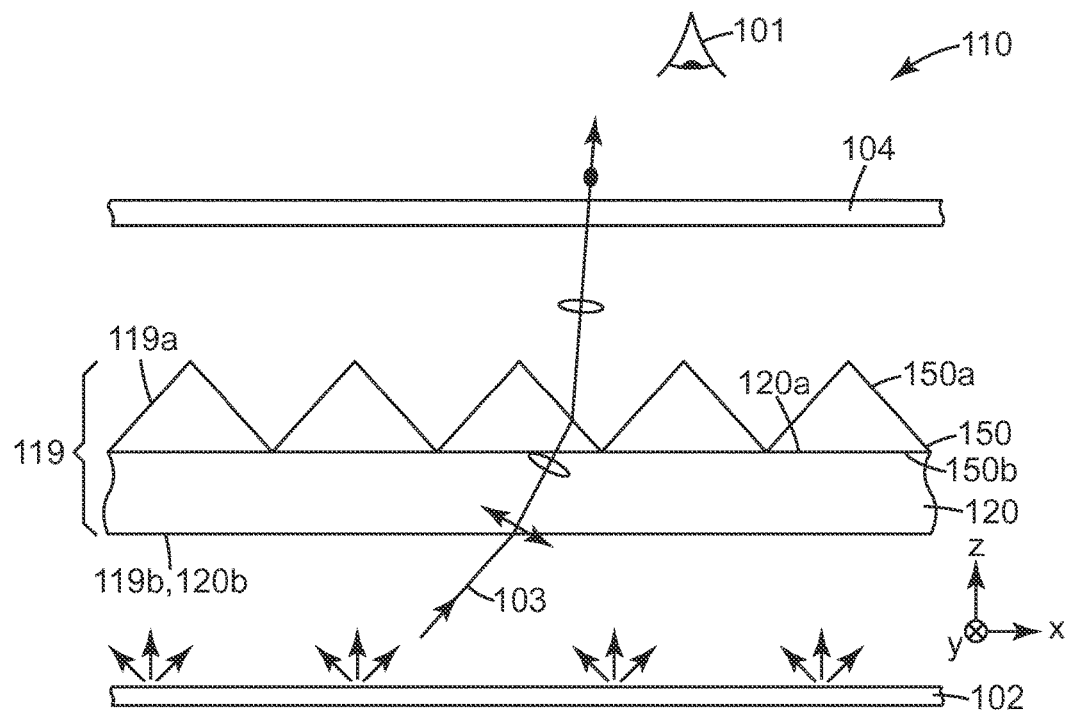
FIG. 1 is a schematic side or sectional view of an optical system that includes a microreplicated optical film having a birefringent substrate, the optical system producing a colored directional pattern or artifact known as substrate color mura (SCM)

In FIG. 1, an optical system 110 includes a microreplicated optical film 119 disposed between an extended light source 102, such as a planar light guide with an extended output surface that emits white light, and a polarizer 104. The optical system 110 may be an optical display, backlight, or similar system, and it may include other components that are not shown in the figure, such as a liquid crystal panel and additional polarizers, diffusers, retarders, and/or other optical films or components. For purposes of the present description, we ignore such other components for ease of explanation. The optical film 119, which has a front major surface 119a and a back or rear major surface 119b, is shown to be constructed from a substrate 120 that carries a prismatic layer 150, although other layer configurations may also be used. The substrate 120 may be said to carry the prismatic layer 150 even in cases where one or more intervening layers physically connect the substrate to the prismatic layer. The prismatic layer 150 may be made by casting and curing a polymer composition onto a polymer film substrate 120 using a micropatterned tool. The tool is configured so that a first major surface 150a of the prismatic layer 150, which coincides with the front major surface 119a of the film 119, is microstructured replica of the tool, with distinct faces or facets that form an array of linear prisms. Besides casting-and-curing, other known manufacturing techniques can also be used to form the microstructured surface 150a, such as embossing, etching, and/or other known techniques. A second major surface 150b of the prismatic layer 150 coincides with a first major surface 120a of the substrate 120. A second major surface 120b of the substrate 120 coincides with the back major surface 119b of the film 119.

A Cartesian x-y-z coordinate system is included in the figure for reference purposes. The film 119 extends generally parallel to the x-y plane, and an optical axis of the system 110 may correspond to the z-axis. Each of the prisms of the structured surface extends in a generally linear direction, at least in plan view, parallel to the y-axis. The array of linear prisms refracts light in such a way that the on-axis brightness or luminance of the system is increased, compared to the same system without the film 119.

The substrate 120 that carries the prismatic layer 150 is birefringent. The birefringence may be an intentional design feature, or it may be unintentional. Films made from polyethylene terephthalate (PET), for example, can be economically made to have desirable mechanical and optical properties for use in optical film applications, but films made from PET may exhibit non-negligible amounts of birefringence. The birefringence may be substantially spatially uniform, i.e., the birefringence at one position within the substrate may be substantially the same as the birefringence at other positions within the substrate. The birefringence is typically characterized at least by an in-plane birefringence. That is, if the substrate has refractive indices nx, ny, nz for light polarized along the x-, y-, and z-axes, respectively, then a significant difference exists between the in-plane refractive indices nx and ny. The x- and y-directions may correspond, for example, to cross-web and down-web directions of a polymer film. The magnitude of nx−ny may typically be at least 0.01, or 0.02, or 0.03. The question of whether a particular refractive index difference is significant can depend on the thickness of the substrate: a small refractive index difference may be negligible for a thin substrate, but significant for a thicker substrate.

In the figure, an arbitrary light ray 103 is shown traveling from the light source 102 to an observer 101. Following this light ray, we see that it is refracted at the major surface 120b (119b), propagates through the substrate 120, is refracted again at the major surface 120a (150b), propagates through the prismatic layer 150, is refracted again at the major surface 150a (119a), travels to the polarizer 104, and one polarization component of the ray passes through the polarizer and travels on to the observer 101. The ray 103 is assumed to be unpolarized as it leaves the light source 102 and before it strikes the film 119. When it strikes the air/substrate interface at major surface 120b, it becomes partially polarized because orthogonal s- and p-polarization states are in general transmitted (and reflected) differently, depending on the angle of incidence and the refractive indices of the substrate. The reflected light components are not shown in FIG. 1 for ease of explanation. A double-headed arrow is superimposed on the ray 103 near the surface 120b to indicate the partial polarization as the light ray 103 begins its path through the substrate 120. As the ray 103 propagates through the substrate 120 toward the surface 120a, its state of partial polarization is, in general, changed due to the birefringence of the substrate 120. This change in polarization state is dependent not only on the amount of birefringence (and the thickness) of the substrate, but also on the angle of propagation of the light ray and the wavelength of the light ray. The changed polarization state is depicted in the drawing as a small ellipse superimposed on the ray 103 near the surface 120a. The light ray with its modified polarization state then is refracted by the prism layer 150, and the polarization component that is aligned with the pass axis of the polarizer 104 passes through the polarizer 104 and to the observer 101.

As mentioned above, the change in polarization state occurring within the substrate 120 depends on the wavelength of the light. This is so even if the substrate material exhibits no dispersion whatsoever. As a result, light rays of different wavelengths that follow the same or nearly the same path through the system 110, such as the path traced out by ray 103, will in general be transmitted in different relative amounts to the observer 101. The relative amounts will depend on the direction of propagation of the light ray, and we assume that a range or cone of propagation directions are present as a result of the source 102 emitting light over a significant angular range, e.g. in a Lambertian distribution or in another suitable angular distribution. The different relative transmission both as a function of wavelength and as a function of propagation direction has the result that an observer 101 who perceives light over a range or cone of propagation directions and over a range of wavelengths, such as over the visible wavelength band from blue through red, observes a colored image or pattern referred to herein as substrate color mura (SCM). If the relevant design characteristics of the substrate 120 and the prismatic layer 150 are substantially spatially uniform, i.e., if they do not substantially change from one place or region on the film to another, the SCM pattern will not be fixed in space from the perspective of the observer 101. Rather, as the observer shifts in position, e.g., along the x- and/or y-axis, relative to the optical film 119, the SCM pattern will appear to shift an equal amount, in unison with the observer 101. Stated differently, if the observer maintains a fixed observation position and viewing angle, but the film is translated along the x- or y-directions, the pattern will be stable if the optical properties of the film are translation independent.

In many practical embodiments that include the components shown in FIG. 1, the SCM pattern is relatively subtle and easily overlooked, unless the observer is well trained and/or specifically looking for the SCM. One reason for the subtlety of the SCM pattern is that the partial polarization provided at the air/substrate interface 120b is typically much weaker than the polarization provided by the polarizer 104.

Figure 2:
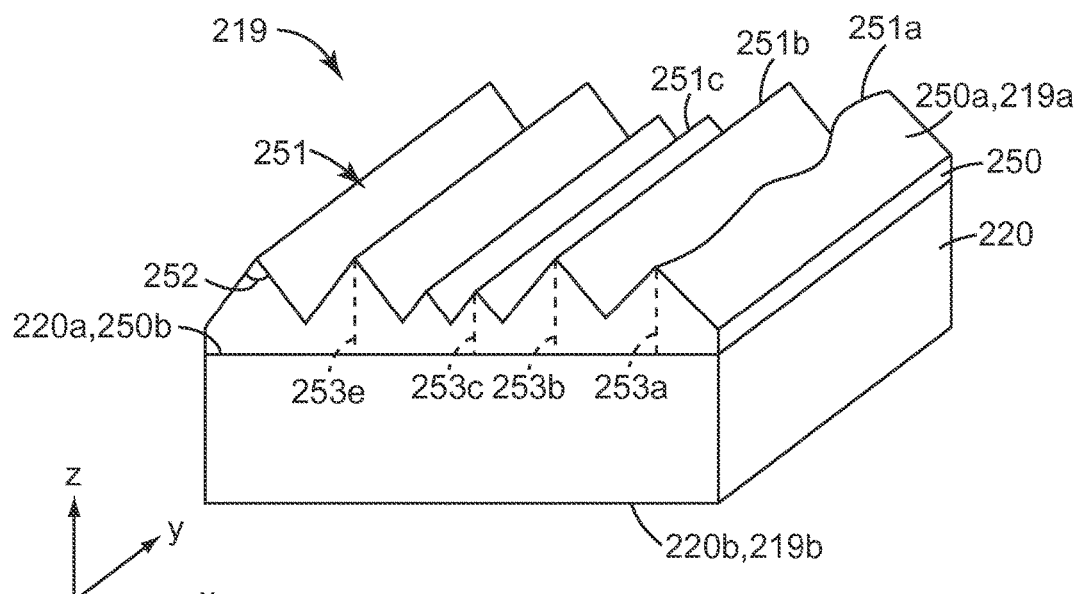
FIG. 2 is a schematic perspective view of a microreplicated optical film having an array of linear prisms, the figure demonstrating various prism configurations that may be used.

Before engaging in further discussion of the SCM pattern, we turn to FIG. 2 to provide the reader with an appreciation of some of the various types of prisms and prism arrays that may be used in the disclosed optical films.

The prisms in FIG. 1 and in other figures below are shown as having nominally the same geometry including height, width, and apex angle. This is primarily for simplicity of illustration. In general, unless otherwise stated, the prisms of the prismatic layer may have any of a wide variety of configurations, as suggested by FIG. 2.

In FIG. 2, a microreplicated optical film 219 is shown that may function as a brightness enhancement film in a display, backlight, or other system. The optical film 219 includes an array of linear prisms or microstructures 251 for improving brightness. The optical film 219 includes a first major or structured surface 219a that includes a plurality of microstructures or linear prisms 251 that extend along the y-direction. The film 219 includes a second major surface 219b that is opposite the first major or structured surface 219a.

The film 219 includes a substrate layer 220 that includes a first major surface 220a and an opposing second major surface 220b, which coincides with major surface 219b.

Optical film 219 includes a prismatic layer 250 that is carried by the substrate layer 220. The prismatic layer 250 is disposed on the major surface 220a of the substrate layer, which surface 220a coincides with a major surface 250b of the layer 250, the layer 250 also including another major surface 250a which coincides with major surface 219a of the film 219.

The optical film 219 includes two layers: substrate layer 220, which for purposes of this description is assumed to be birefringent, and prismatic layer 250. In general, the optical film 219 can have one or more layers. For example, in some cases, the optical film 219 can have only a single layer that includes respective first and second major surfaces 219a, 219b. As another example, in some cases, the optical film 219 can have many layers. For example, in some cases, the substrate 220 may be composed of multiple distinct layers. When the optical film includes multiple layers, the constituent layers are typically coextensive with each other, and each pair of adjacent constituent layers comprise tangible optical materials and have major surfaces that are completely coincident with each other, or that physically contact each other at least over 80%, or at least 90%, of their respective surface areas.

Prisms 251 may be designed to redirect light that is incident on major surface 219b of the optical film 219, along a desired direction, such as along the positive z-direction. In the exemplary optical film 219, prisms 251 are linear prismatic structures. In general, the prisms 251 can be any type of prisms or prism-like microstructures that are capable of redirecting light by, for example, refracting a portion of incident light and recycling a different portion of the incident light. For example, the cross-sectional profiles of prisms 251 can be or include curved and/or piece-wise linear portions.

Each of the prisms 251 includes an apex angle 252 and a height measured from a common reference plane such as, for example, major surface 250b. Individual prisms 251a, 251b, 251c, etc., are shown with heights 253a, 253b, 253c, . . . , 253e, and so forth. In some cases, e.g. when it is desirable to reduce optical coupling or wet-out and/or improve durability of the light redirecting optical film, the height of a given prism 251 can change along the y-direction. For example, the prism height of linear prism 251a varies along the y-direction. In such cases, prism 251a has a local height 253a that varies along the y-direction, the varying height defining a maximum height and an average height. In some cases, a prism, such as linear prism 251c, has a constant height along the y-direction. In such cases, the prism has a constant local height 253c that is equal to the prism's maximum height and average height.

In some cases, such as when it is desirable to reduce optical coupling or wet-out, some of the linear prisms are shorter and some are taller. For example, height 253c of linear prism 251c is smaller than height 253b of linear prism 251b.

The apex or dihedral angle 252 of each prism can have any value that may be desirable in an application. For example, in some cases, apex angle 252 can be in a range from about 70 degrees to about 110 degrees, or from about 80 degrees to about 100 degrees, or from about 85 degrees to about 95 degrees. In some cases, the prisms 251 have equal apex angles which can, for example, be in a range from about 88 or 89 degrees to about 92 or 91 degrees, such as 90 degrees.

Prismatic layer 250 can be composed of any suitable light-transmissive material and may have any suitable index of refraction. For example, in some cases, the prismatic layer may have an index of refraction in a range from about 1.4 to about 1.8, or from about 1.5 to about 1.8, or from about 1.5 to about 1.7. In some cases, the prismatic layer may have an index of refraction that is not less than about 1.5, or not less than about 1.55, or not less than about 1.6, or not less than about 1.65, or not less than about 1.7. The prismatic layer may be entirely or partially birefringent, and it may be entirely or partially (substantially) isotropic.

In most cases, such as when the optical film 219 is used in a liquid crystal display system, the optical film 219 increases the on-axis brightness of the display, i.e., the brightness as measured along the z-axis, when compared to the identical display without the optical film 219. For purposes of quantifying the improvement in axial luminance, the optical film 219 is said to have an "effective transmission", or relative "gain", that is greater than 1. As used herein, "effective transmission" ("ET") refers to the ratio of the on-axis luminance with the film in place to the on-axis luminance of the display system without the film in place, when the light source is a Lambertian or nearly Lambertian source with a diffuse reflectivity >80%.

The ET of the optical film can be measured using an optical system that includes a hollow Lambertian light box, a linear light absorbing polarizer, and a photodetector centered on an optical axis of the light box. The hollow light box may be illuminated by a stabilized broadband light source connected to an interior of the light box via an optical fiber, and the light emitted from an emitting or exit surface of the light box may have a Lambertian luminance distribution. The optical film or other test sample whose ET is to be measured is placed at a location between the light box and the absorbing linear polarizer. Dividing the photodetector output with the optical film present in the system by the photodetector output with the optical film absent from the system yields the ET for the optical film.

A suitable photodetector for use in measuring ET is a SpectraScan™ PR-650 SpectraColorimeter, available from Photo Research, Inc, Chatsworth, Calif. A suitable light box for such measurements is a Teflon cube having a total reflectance of about 85%.

The ET of the optical film 219 can be measured by placing the optical film 219 at the specified location with the major surface 219a (and the linear prisms 251) facing the photodetector and the major surface 219b facing the light box. Next, the spectrally weighted axial luminance I1 (the luminance along the optical axis) is measured through the linear absorbing polarizer by the photo detector. The optical film 219 is then removed and the spectrally weighted luminance I2 is measured without the optical film 219. ET is the ratio I1/I2. The ET may be specified in further detail by specifying the orientation of the optical film relative to the linear absorbing polarizer. For example, "ET0" refers to the effective transmission when the optical film is oriented such that each of the prisms 251 extends along a direction that is parallel to the pass axis of linear absorbing polarizer, and "ET90" refers to the effective transmission when the optical film is oriented such that each of the prisms 251 extends along a direction that is perpendicular to the pass axis of the linear absorbing polarizer. Further in this regard, the "average effective transmission" ("ETA") is the average of ET0 and ET90. In view of this additional terminology, the term "effective transmission" or "ET" referred to earlier, without more, refers to the average effective transmission of the optical film.

In exemplary cases, the disclosed microreplicated optical films, including optical film 219, are configured to increase system brightness, and the linear prisms have a refractive index of at least about 1.6, and the average effective transmission (ETA) of the optical film is at least about 1.3, or at least 1.5, or at least 1.7, or at least 1.9, or at least 2.1.

Figure 3:
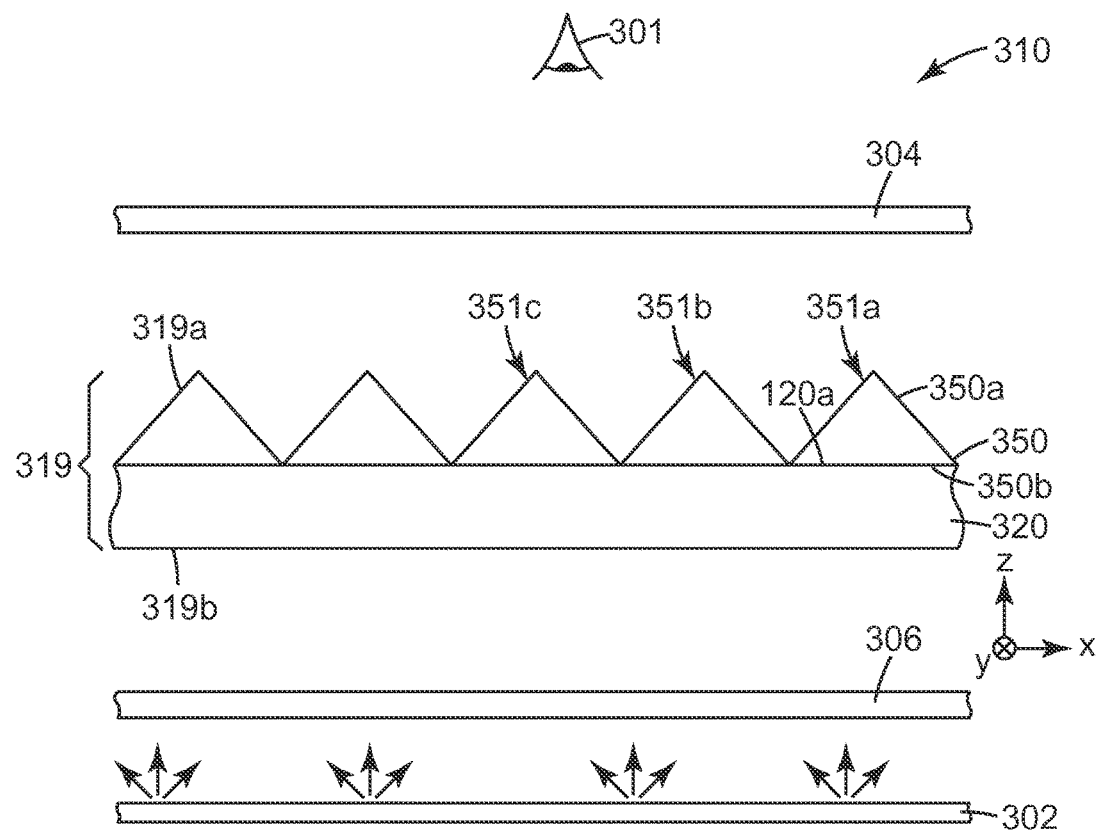
FIG. 3 is a schematic side or sectional view of an optical system that may be similar to that of FIG. 1, but where a rear polarizer is added to substantially increase the visibility of the substrate color mura.

In FIG. 3, an optical system 310 is shown that is similar in some respects to the system of FIG. 1, except that another polarizer has been added, allowing easier observation and measurement of SCM. In particular, like system 110, the system 310 includes an extended light source 302, a polarizer 304, and a microreplicated optical film 319 disposed between the light source and the polarizer. Similar to optical film 119, the optical film 319 has a front major surface 319a and a back or rear major surface 319b, and is constructed from a substrate 320 that carries a prismatic layer 350, although other layer configurations may also be used. A second major surface 350b of the prismatic layer 350 coincides with a first major surface of the substrate 320. A second major surface of the substrate 320 coincides with the back major surface 319b of the film 319. Also similar to optical film 119, the substrate 320 that carries the prismatic layer 350 is birefringent, as discussed in connection with FIG. 1. An observer 301, similar to observer 101, perceives light over a range or cone of propagation directions and over a range of wavelengths, such as over the visible wavelength band from blue through red.

Unlike FIG. 1, the system 310 of FIG. 3 is shown to include a second or rear polarizer 306, disposed between the film 319 and the light source 302, so that the film 319 is disposed between the rear polarizer 306 and the front polarizer 304. The addition of the rear polarizer 306 increases the visibility of the SCM pattern, because the rear polarizer increases the degree of polarization of the light entering the birefringent substrate 320. We refer to the SCM observed in a system such as that of FIG. 3 as an "enhanced" SCM, because steps are taken to enhance the visibility of the SCM by sandwiching the optical film in question between two actual linear polarizers rather than relying on partial polarization provided by Fresnel reflection at an air/media interface.

Figure 3A:
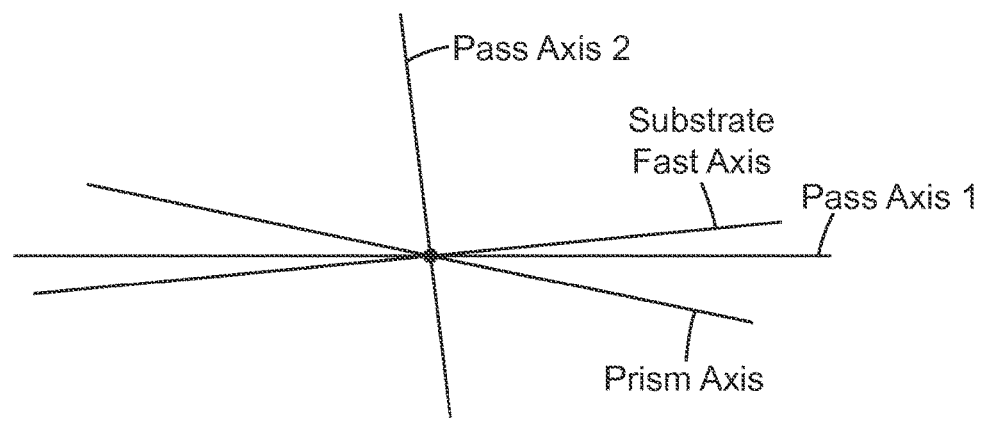
FIG. 3a is a schematic diagram depicting, in a top or plan view, relevant axes of films and components in the optical system of FIG. 3.

The system 310 includes a number of films and components that have an in-plane orientation axis of some type. For example, the prismatic layer 350 comprises an array of prisms (see individual prisms 351a, 351b, 351c) in which each of the prisms extends parallel to a prism axis such as the y-axis, as shown in FIG. 2. The front polarizer 304 has a pass axis, referred to here as pass axis 1, such that light polarized parallel to the pass axis is substantially transmitted by the polarizer, and light polarized perpendicular to the pass axis is substantially absorbed or otherwise blocked. The rear polarizer 306 also has a pass axis, referred to here as pass axis 2. The substrate 320 is birefringent, and can be characterized by an in-plane axis of minimum refractive index, referred to here as a substrate fast axis. The prism axis, the pass axis 1, the pass axis 2, and the substrate fast axis are all shown together in FIG. 3a in plan view, e.g., from the perspective of the observer 301.

The axes shown in FIG. 3 are shown with relative rotations that permit easy identification of the different axes for purposes of the figure. In general, these axes, and the films and layers they correspond to in FIG. 3 and elsewhere herein, may have any desired relative orientation. In general, the relative orientations have an effect on the observed SCM. In one scenario, explained further below, the pass axis 1 is orthogonal to pass axis 2, and the prism axis and the substrate fast axis are both parallel to the pass axis 1.

A microreplicated film, an extended white light source, and two linear absorbing polarizers were obtained and arranged substantially as shown in FIG. 3. The microreplicated film was 3M™ Thin Brightness Enhancement Film— TBEF2-GT (24), and had a prismatic layer of linear prisms carried by a PET substrate. The linear prisms each extended parallel to a prism axis. The PET substrate was about 50 micrometers thick, and had an in-plane birefringence defining a fast axis. The prismatic layer had a refractive index of about 1.64, and a prism pitch of about 24 micrometers.

Figure 4:
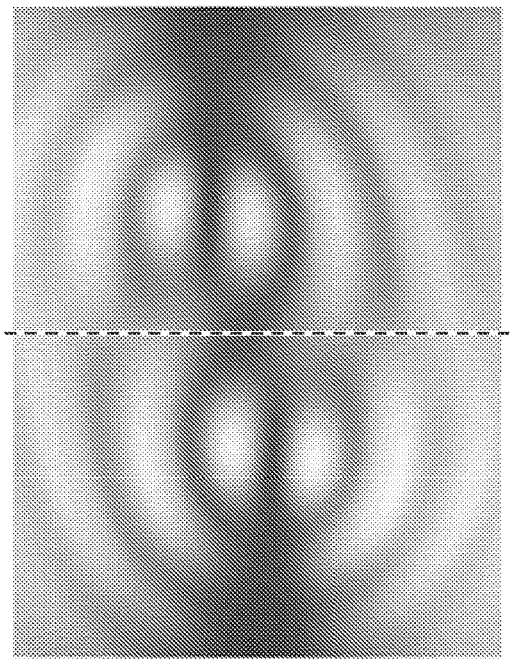
FIG. 4 is a conoscopic image of an enhanced SCM pattern shown in grayscale.

In a first orientation, the front and back polarizers were oriented with their pass axes orthogonal to each other, and the fast axis of the substrate was slightly misaligned, i.e., not parallel, to the prism axis. An enhanced SCM pattern, with its colored bands and features, was observed. A camera was used to record a conoscopic image of the SCM pattern, and a grayscale version of the image is shown in FIG. 4. In the figure, a horizontal dashed line is provided to represent the direction of the prism axis of the optical film. The center of the image represents the axial direction of the optical system, e.g., the z-direction in FIG. 3. The distance from the center of the image to any of the four corners of the figure represents a polar angle of about 20 degrees.

Figure 5:
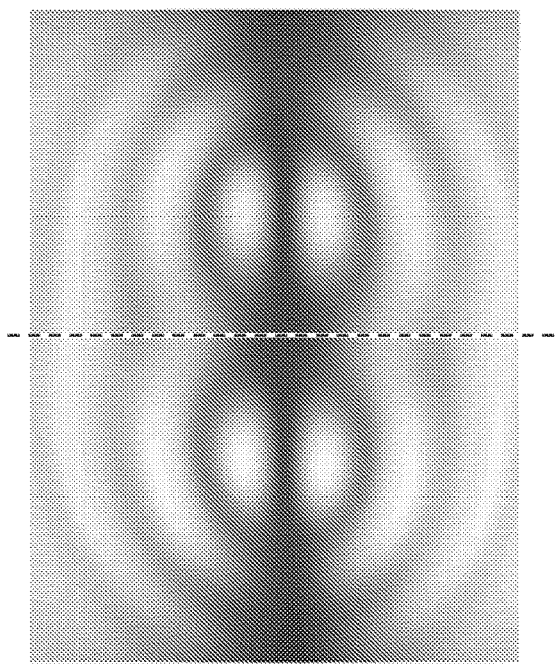
FIG. 5 is a conoscopic image of another enhanced SCM pattern shown in grayscale.

Another image was taken using the same optical components and the same general arrangement of FIG. 3, but in a second orientation. The second orientation was similar to the first orientation except that the substrate fast axis was parallel to the prism axis. The prism axis was parallel to the pass axis of the front polarizer. With this setup, another enhanced SCM pattern was observed. The camera was used to record a conoscopic image of the SCM pattern, and a grayscale version of the image is shown in FIG. 5. A horizontal dashed line is provided in the figure to represent the direction of the prism axis of the optical film. The center of the image represents the axial direction of the optical system, e.g., the z-direction in FIG. 3. The distance from the center of the image to any of the four corners of the figure represents a polar angle of about 20 degrees.

An optical system corresponding substantially to that of FIG. 3 was also simulated using optical modeling software. In the simulation, the extended light source was assumed to emit white light in a Lambertian emission distribution. The front and back polarizers were assumed to be oriented such that their pass axes intersected at an angle of 90 degrees. The prisms of the prismatic layer were assumed to be of uniform height and apex angle, the apex angle being 90 degrees. The refractive index of the prisms was assumed to be 1.64, and isotropic. The substrate was assumed to have a physical thickness of 2.05 mils (52 micrometers), and refractive indices nx, ny, and nz for light polarized along the x, y, and z-axes, respectively, such that: $ny-nx=0.037695$; $nz-((nx+ny)/2)=-0.1679$; and $(nx*nx+ny*ny+nz*nz)/3=(1.61383)^2$. The substrate layer was assumed to have an absorption of 0.0191 $mm^{-1}$ These values are representative of a polyethylene terephthalate (PET) film whose fast axis may be oriented as desired in the x-y plane. For purposes of the simulation, the substrate fast axis was assumed to be parallel to the prism axis and parallel to the pass axis of the front polarizer.

Figure 5A:
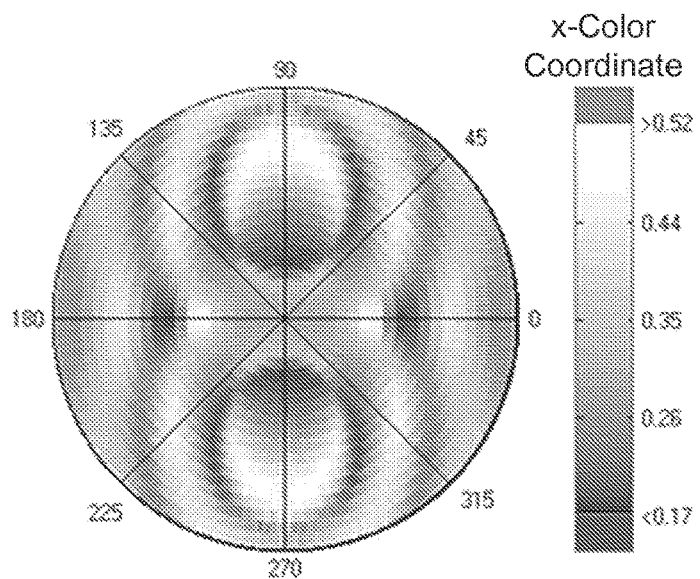
FIGS. 5a and 5b are simulated conoscopic images of CIE color components that make up a simulated enhanced SCM pattern, where
Figure 5B:
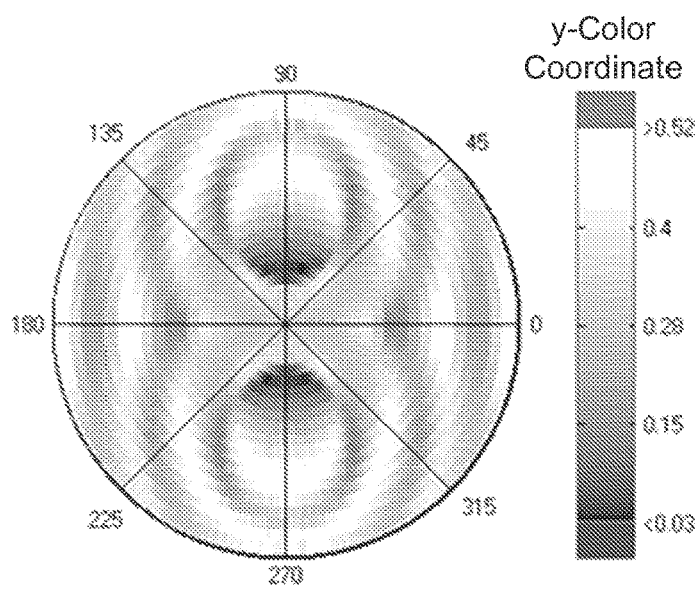

With the system components so defined, the optical simulation software was used to produce a transmission spectrum at each conoscopic angle of the enhanced SCM as it would appear to an observer 301. The computed conoscopic image was similar to FIGS. 4 and 5, and it included colored bands and features. The computed conoscopic spectrum was decomposed into CIE x and y color coordinates at each angle. FIGS. 5a and 5b are the result of such a color decomposition procedure. Beginning with the original simulated (color) conoscopic spectra, each point or pixel in the image, which represents a particular polar angle and a particular azimuthal angle, was evaluated for its color in CIE (x,y) color coordinates. The CIE color coordinates characterize a mathematically defined color space that was developed in 1931 by the Commission international de l'eclairage ("CIE", or International Commission on Illumination), and is known in the art. The CIE x and y color coordinates should not be confused with x and y coordinates associated with physical position or displacement, e.g. as shown with the Cartesian x-y-z (physical) coordinate system of FIG. 1, 2, or 3. Unlike physical coordinates, the (x,y) color coordinates are unitless.

After determining the CIE (x,y) color coordinates of each point in the original (color) simulated conoscopic image, the image was separated into its constituent CIE x-coordinate and CIE y-coordinate component colors. This produced two conoscopic images: the image of FIG. 5a, which plots the CIE x color component, and FIG. 5b, which plots the CIE y color component. In each of FIGS. 5a and 5b, the center of the image represents the axial direction of the optical system, e.g. the z-direction in FIG. 3, and the circular outer boundary of the image represents a polar angle of 20 degrees. The numbers 0, 45, 90, etc. at the outer boundary of each image represent the azimuthal angle in units of degrees of arc. The prism axis of the prismatic layer of the optical film corresponds to azimuthal angles of 0 and 180 degrees. To the right of each image is a scale in the form of a vertical bar showing the correspondence of color coordinate value to the shade of gray used in the figures.

The enhanced SCM patterns shown in FIGS. 4, 5, 5a, and 5b would be easily noticed by an observer of the optical system of FIG. 3. The ordinary (non-enhanced) SCM pattern generated by an optical system such as that of FIG. 1 is in general more subtle and not so easily noticed by ordinary observers. Nevertheless, whether enhanced or non-enhanced, we wish to determine if the SCM pattern can be eliminated or at least substantially reduced, preferably without having to replace the birefringent substrate with a more expensive isotropic substrate, and preferably without substantially adversely affecting the brightness enhancement capabilities of the optical film, and preferably without introducing any additional adverse optical phenomena or artifacts.

Figure 6:
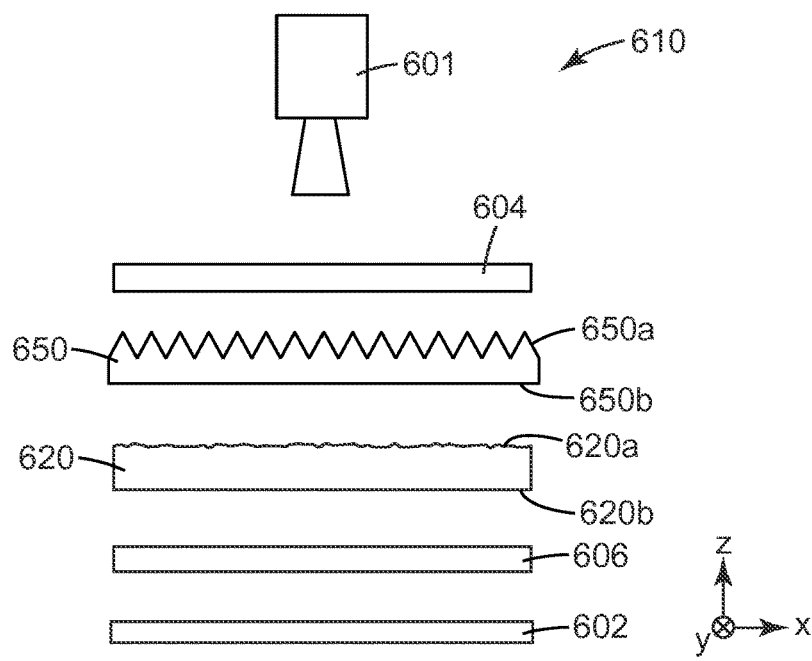
FIG. 6 is a schematic side or sectional view of an optical system similar to that of FIG. 3, but where the prismatic layer and the birefringent substrate are shown spaced apart from each other, and an upper major surface of the substrate is structured to provide surface diffusion or haze.

In order to accomplish one or more of these ends, we investigate adding light scattering, diffusion, or haze using a non-smooth, textured, or otherwise structured surface. In this regard, FIG. 6 shows an optical system 610 that can be used to investigate whether the SCM pattern can be fully or partially eliminated by introducing light scattering or haze into the system. In this setup, we isolate the prismatic layer from the birefringent substrate by physically separating these components and providing an air gap therebetween. We also modify the upper major surface of the birefringent substrate to make it non-smooth, textured, or otherwise structured, such that it acts as a surface diffuser.

The resulting optical system 610 is similar to system 310 of FIG. 3, but the optical film has been divided into a prismatic layer 650 and a birefringent substrate 620 that are completely separated from each other by an air gap. The prismatic layer 650 has a first major surface 650a that is structured to form an array of prisms, and a second major surface that is assumed to be flat and smooth. The prismatic layer 650 may be the same as or similar to the prismatic layers discussed in connection with FIGS. 1, 2, and 3. For the present discussion, the prismatic layer 650 is assumed to be composed of an isotropic material, having no significant birefringence. The substrate 620 has a first major surface 620a that is non-smooth, textured, or otherwise structured, and a second major surface 620b that is assumed to be flat and smooth. The substrate 620 is assumed to be birefringent, and more particularly, it is assumed to have an in-plane birefringence, such that the refractive index (e.g. nx) for light polarized along one in-plane direction differs from the refractive index (e.g. ny) for light polarized along an orthogonal in-plane direction.

Similar to system 310, the system 610 also includes: an extended light source 602, which may be the same as or similar to light sources 102 or 302; first and second polarizers 604, 606, which may be the same as or similar to polarizers 304, 306 of FIG. 3, and between which the prismatic layer 650 and birefringent substrate 620 are disposed; and a detector 601. The detector 601 may be a human observer similar to observers 101, 301, or the detector 601 may be a camera or similar optical device. Similar to observers 101, 301, the detector 601 is configured to image light over a range or cone of propagation directions and over a range of wavelengths, such as over the visible wavelength band from blue through red.

Figure 6A:
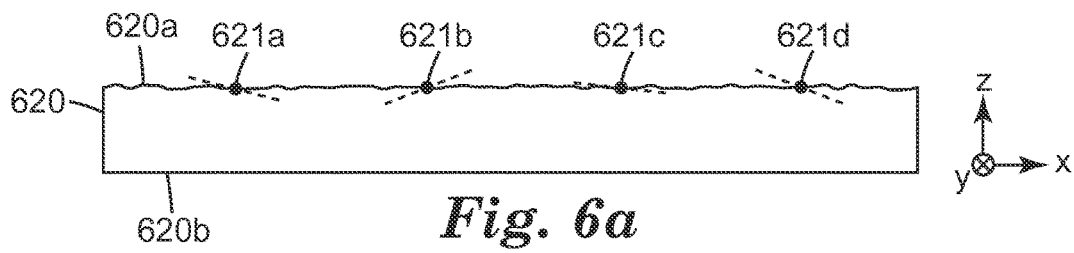
FIG. 6a is a schematic side or section view showing the birefringent substrate of FIG. 6 in more detail.

An enlarged view of the birefringent substrate 620 is shown in FIG. 6a. The surface 620a is structured and exposed to air, and it functions as a structured surface diffuser. The surface 620a can be characterized in terms of the distribution of slopes or orientations over the entire surface. In this regard, the structured surface 620a has a measurable slope or orientation at any given point on its surface. A "point" in this regard may refer to a region or portion of the surface that is small enough so that it is substantially locally flat. Some representative points and slopes are shown in FIG. 6a: at points 621a, 621b, 621c, 621d, the surface 620a has a slope or orientation indicated by the dashed lines passing through the respective points. In real 3-dimensional space, the dashed lines represent planes that are tangent to the structured surface 620a at the points, and the dihedral angle α between each such plane and the plane of the substrate, i.e., the x-y plane, can be measured or otherwise determined. The angle α may be referred to as a slope angle, orientation angle, or surface angle.

The overall distribution of surface angles, when sampled over the entire structured surface, will in general be different for different types of structured surfaces. For purposes of simulating the optical system 610 of FIG. 6, for simplicity and generality, we may assume that the structured surface 620a has a surface angle distribution that is Gaussian in shape. Such a Gaussian distribution is shown as curve 605 in FIG. 6b. The Gaussian distribution 605 has a maximum at a surface angle α of zero, corresponding to surface portions oriented parallel to the plane of the film, and the distribution 605 decreases for increasing values of α, meaning that progressively smaller fractions of the surface 620a are tilted at higher and higher values of α. The Gaussian distribution is completely characterized by a standard deviation parameter σ, which is given in the same units as a, i.e., degrees (or radians). For simulation purposes, the amount or severity of topographic variation for the structured surface 620a is controlled or specified by selecting a suitable value for σ, with σ=0 corresponding to a smooth, planar surface (no topographic variability), small values of σ corresponding to a lightly structured surface, and large values of σ corresponding to a heavily structured surface. Since the structured surface 620a is exposed to air, the amount of topographic variability is directly related to the amount of haze provided by the structured surface. Haze can also be provided by a structured surface that is embedded, as discussed further below.

Light diffusion or scattering can be expressed in terms of a parameter called "optical haze" or simply "haze". For a film, surface, or other object that is illuminated by a normally incident light beam, the optical haze of the object refers to the ratio of transmitted light that deviates from the normal direction by more than 4 degrees to the total transmitted light. Haze can be calculated in a simulation, and for actual samples it can be measured using a Haze-Gard Plus haze meter (available from BYK-Gardner, Columbia, Md.) according to the procedure described in ASTM D1003, or with other suitable procedures. Related to optical haze is optical clarity, which refers to the ratio $(T_1-T_2)/(T_1+T_2)$, where $T_1$ is the transmitted light that deviates from the normal direction between 1.6 and 2 degrees from the normal direction, and $T_2$ is the transmitted light that lies between zero and 0.7 degrees from the normal direction. Clarity values may also be measured using the Haze-Gard Plus haze meter from BYK-Gardiner.

Simulations were carried out on the optical system of FIG. 6 as described above. For the simulations, different values of σ were selected to represent different amounts of variability of the structured surface 620a, corresponding to different amounts of light scattering. The amount of light scattering, and in fact the full parameterization of a diffuse surface, requires both the parameter σ and the surface fraction of scattering structures.

Many different simulation techniques can be used to model the optical system of FIG. 6. In some cases a particular surface topography, e.g., a particular arrangement of lenslets, or an undulating surface having a particular geometry, can be defined and used in the simulation. In the present case, however, simulations were performed without assuming any specific surface topography so that the simulation results would be more generally applicable to a variety of topographies. The structured surface was instead represented by a plane, and, during ray tracing, the surface was treated for purposes of calculating the angle of refraction as if it had a local inclination at the point of intersection of the light ray and the plane representing the structured surface. Thus, when any simulated light ray impinged upon that plane at a given point, the software modified the surface at the point of intersection so that it was assumed to be inclined at an angle that was selected in accordance with a weighted random function based on a Gaussian distribution and the value of σ for the simulation. This inclination was used only to compute the direction and other relevant characteristics of the particular refracted ray, and was not thereafter saved or otherwise associated with the particular point of intersection for the remainder of the simulation.

The simulations were carried out on the optical system of FIG. 6 as described above. The simulations assumed the layers shown in FIG. 6 had the following properties:
  prismatic layer 650: refractive index 1.64, prism angle 90 degrees, prisms all of the same symmetric orientation;
  birefringent substrate layer 620: physical thickness of 2.05 mils (52 micrometers). Refractive indices were assumed to be nx, ny, and nz for light polarized along the x, y, and z-axes, respectively, such that ny−nx=0.037695, nz−((nx+ny)/2)=−0.1679, and (nx*nx+ny*ny+nz*nz)/3=(1.61383)². The substrate layer was assumed to have an absorption of 0.0191 mm$^{-1}$ These values are representative of a polyethylene terephthalate (PET) film whose fast axis may be oriented as desired in the x-y plane.
The front and back polarizers were assumed to be crossed, i.e., oriented at a 90 degree relative rotation angle. In some of the simulations, the bias angle between the prism axis and the pass axis of the front polarizer was assumed to be 45 degrees. In other simulations, the bias angle was assumed to be zero, i.e., the prism axis was parallel to the pass axis of the front polarizer.

Simulations were performed for a variety of structured surface parameters σ (at 100% surface coverage) and thus for various amounts of haze provided by the structured surface 620a, the haze ranging from 0% to about 92%, corresponding to σ ranging from 0 to 30 degrees. For each simulation performed, a conoscopic plot of the enhanced SCM pattern was generated. Some of the conoscopic plots are shown in FIGS. 7a through 7e. These figures depict the computed CIE x color component of the enhanced SCM pattern over a polar angle range from 0 to 20 degrees. FIGS. 7a, 7b, 7c, 7d, and 7e were generated for haze amounts of 0%, 1%, 1.8%, 2.7%, and 6.2% respectively, and all of these figures assumed an alignment of the prism direction, substrate fast axis, and top polarizer pass axis all along 0 degrees. Comparison of these figures shows that the visibility of the enhanced SCM can be significantly reduced by increasing the haze of the structured surface 620a in FIG. 6.

In order to quantify how much the SCM pattern visibility is reduced, a parameter is needed that is fairly representative of the visibility of any given SCM pattern. We refer to this parameter as SCM visibility. The SCM visibility can be defined in any number of ways. Preferably, the SCM visibility takes into account both variations in brightness and variations in color over a defined range of polar angle and over a full 360 degrees of azimuthal angle, for a given conoscopic plot. For purposes of this specification, unless otherwise noted, we assume:

$$\text{SCM visibility} = \sqrt{\sigma_x^2 + \sigma_y^2},$$

where $\sigma_x$ and $\sigma_y$ (not to be confused with the surface variability parameter σ) are the standard deviations of the x and y color coordinates over the conoscopic image polar and azimuthal angle range. Using this definition for SCM visibility, the visibility of the SCM patterns associated with FIGS. 7a, 7b, 7c, 7d, and 7e is calculated to be 0.108, 0.092, 0.069, 0.055, and 0.051 respectively. The SCM visibility parameter, defined in this way, is fairly representative of the visibility of an SCM pattern in a conoscopic plot.

Figure 8:
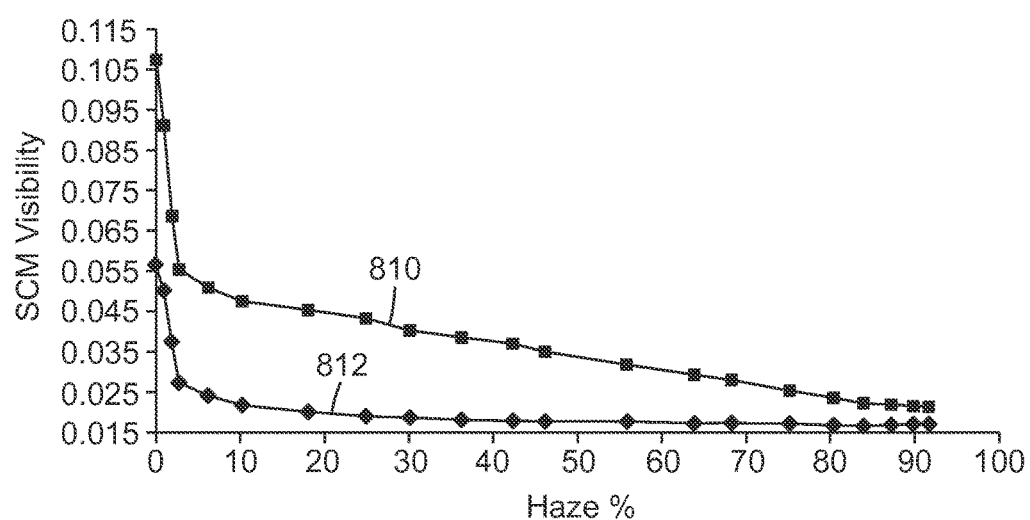
FIG. 8 is a graph of computed SCM visibility as a function of haze for the optical system of FIG. 6, for two different orientations of the prism array.

With the SCM visibility defined in this way, we can analyze the output of the simulations and quantitatively evaluate the visibility of the enhanced SCM pattern for the system of FIG. 6 as a function of the surface variability σ or haze, and for the different bias angles that were used. The results of this analysis are provided in the graph of FIG. 8. In FIG. 8, the SCM visibility, as described above, is plotted as a function of haze, where again haze is directly related to the surface variability σ with the surface fraction=100%. Data points for the simulated zero degree bias orientation (where bias refers to the relative angle between the prism direction and the top polarizer pass axis) form a curve 810, and data points for the simulated 45 degree bias condition form a curve 812. At least two things are apparent from the graph. First, a zero degree bias angle produces a more visible SCM pattern at any given haze value than a 45 degree bias angle. Second, both data sets exhibit an initial rapid reduction in SCM visibility for very small amounts of haze, and then a slower reduction in SCM visibility for greater amounts of haze. A break point between the region of rapid reduction and the region of slower reduction occurs at a haze of about 2%. Note that the five data points at the extreme left side of curve 810 correspond to the SCM visibilities associated with FIGS. 7a through 7e, respectively.

Figure 9:
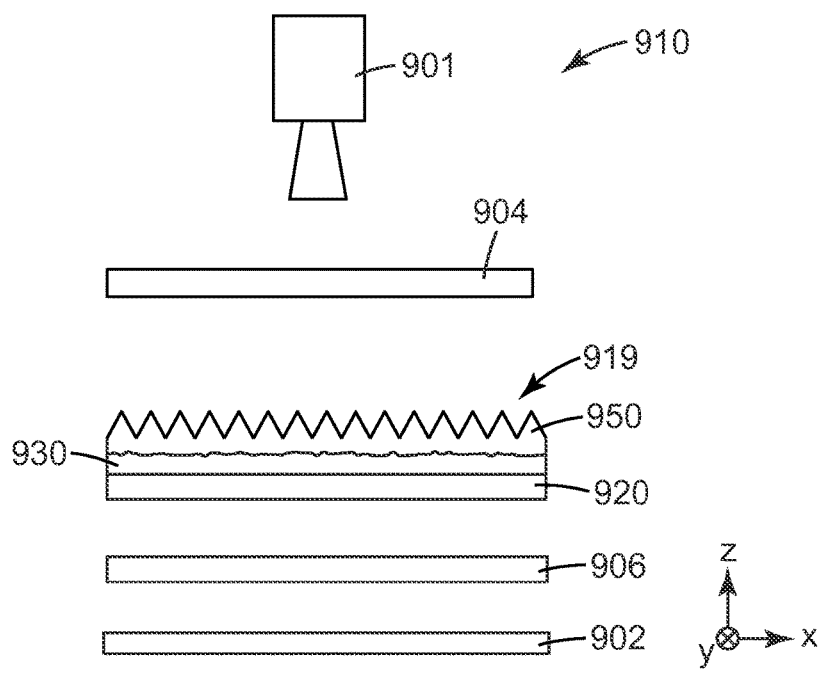
FIG. 9 is a schematic side or sectional view of an optical system similar to that of FIG. 6, but where the components of the optical film are no longer separated by an air gap but are joined together in a single film using an additional layer, and the structured surface is embedded within the optical film.

Similar to FIG. 6, FIG. 9 shows a setup that was used for another set of simulations to investigate whether the enhanced SCM pattern can be fully or partially eliminated by introducing light scattering or haze into the system. Like system 610, the optical system 910 of FIG. 9 includes: an extended light source 902, which may be the same as or similar to light source 602; first and second polarizers 904, 906, which may be the same as or similar to polarizers 604, 606, and a detector 901, which may be the same as or similar to the detector 601.

The system of FIG. 9 differs from that of FIG. 6, however, in that no air gap is provided between the prismatic layer and the birefringent substrate, and the light scattering or haze is provided by an embedded structured surface rather than an exposed structured surface. Thus, in system 910, a single microreplicated optical film 919 is disposed between the two polarizers, the film 919 including a birefringent substrate 920 and a prismatic layer 950 between which no air gap is provided. The substrate 920 carries the prismatic layer 950 as well as a separate light diffusing layer 930, which is included in the film construction and disposed between the prismatic layer and the substrate. The prismatic layer 650 has a first major surface that is structured to form an array of prisms, which prism array may be the same as or similar to the prism arrays described elsewhere herein. For the present discussion, the prismatic layer 950 is assumed to be composed of an isotropic material, having no significant birefringence. The substrate 920 has a first and second major surface that are each assumed to be flat and smooth. The substrate 920 is assumed to be birefringent, as discussed in connection with substrate 620 above.

Figure 9A:
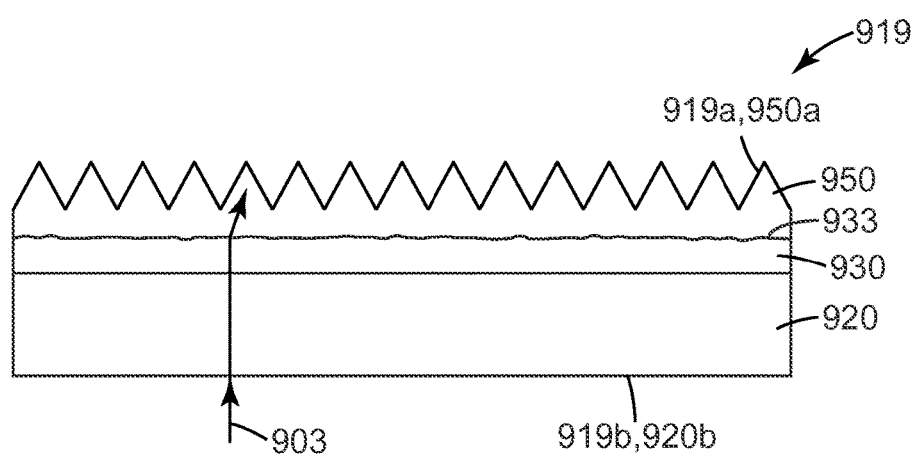
FIG. 9a is a schematic side or sectional view showing the optical film of FIG. 9 in more detail.

The optical film 919 of optical system 910 is shown in more detail in FIG. 9a. The film 919 has a front major surface 919a, coinciding with a first major surface 950a of prismatic layer 950, and a back or rear major surface 919b, coinciding with a second major surface of birefringent substrate 920. The light diffusing layer 930 of the film 919 can be seen between the prismatic layer 950 and the birefringent substrate 920. An interface or surface 933 between the light diffusing layer and the prismatic layer is non-flat, textured, or otherwise structured to provide a controlled amount of light scattering or haze. The structured surface 933 can be said to be buried or embedded, because it is bounded on opposite sides by light-transmissive materials that are solid or otherwise tangible, for example, suitable light-transmissive polymer materials. This is in contrast to the structured surface 620a of FIG. 6, which is exposed to air or vacuum. For purposes of the simulations, for simplicity, the light diffusing layer 930 was assumed to have no volume scattering properties, i.e., no light scattering elements were present between the opposed major surfaces of the light diffusing layer 930. Similar to the simulations associated with FIG. 6, the structured surface 933 in the film 919 was assumed to have a Gaussian slope distribution characterized by the same standard deviation parameter $\sigma$ that was discussed in connection with FIG. 6b.

In FIG. 9a, a light ray 903 from the light source can be seen traveling through the optical film 919, the ray being deflected or scattered at the structured surface 933 between the diffusing layer and the prismatic layer. A structured surface with a given amount of surface variability $\sigma$ would not be expected to provide the same amount haze in an exposed configuration (see e.g. FIGS. 6 and 6a) relative to the haze it would provide in an embedded configuration (see e.g. FIGS. 9 and 9a). This is because the difference in refractive index of the media on opposite sides of the structured surface would typically, although not necessarily, be much larger in an exposed configuration compared to an embedded configuration. Hence, a structured surface with a given value of surface variability $\sigma$ would typically produce substantially less haze in an embedded configuration than in an exposed configuration.

With this in mind, simulations were performed for the arrangement of FIG. 9, assuming the layers shown in FIG. 9a have the following properties:

prismatic layer 950: same properties as those assumed for the simulations of FIG. 6, except that its major surface opposite the prismatic surface was assumed to contact the light diffusing layer and have a surface variability characterized by the surface variability parameter $\sigma$;
birefringent substrate layer 920: same properties as those assumed for the simulations of FIG. 6, except that both major surfaces were assumed to be flat and smooth;
light diffusing layer 930: isotropic refractive index assumed to equal selected values for different simulations: 1.6, 1.57, 1.54, 1.5, 1.45, or 1.4.

The front and back polarizers 904, 906 were assumed to be crossed, i.e., oriented at a 90 degree relative rotation angle. For all of the simulations, the bias angle between the prism axis of the prismatic layer and the pass axis of the front polarizer was assumed to be zero degrees, corresponding to the high SCM visibility orientation of FIG. 8.

Simulations were performed for a variety of structured surface parameters $\sigma$ (at 100% surface coverage) ranging from 0 to 30 degrees, which resulted in various amounts of haze provided by the structured surface 933. Simulations were also performed for a variety of isotropic refractive indices assumed for the light diffusing layer 930 as provided above.

Figure 10:
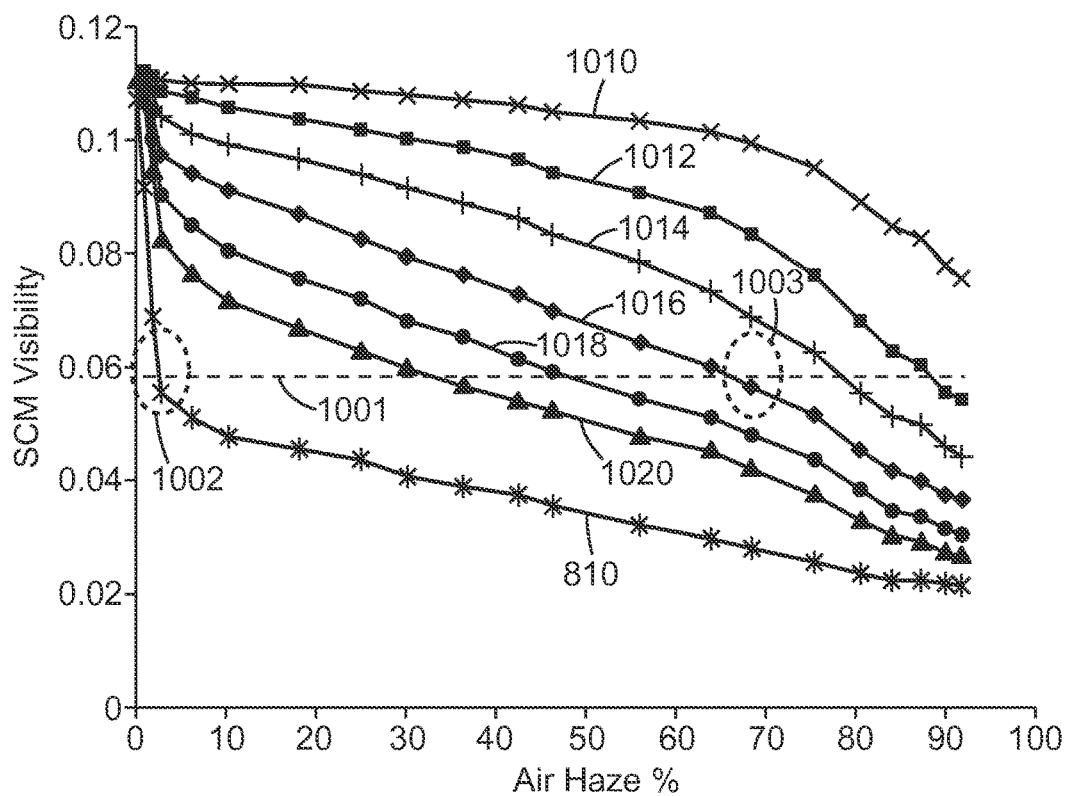
FIG. 10 is a graph of computed SCM visibility as a function of haze for the optical system of FIG. 9.

For each simulation performed, a conoscopic plot or image, typically containing an enhanced SCM pattern, was generated. The visibility of each such SCM pattern was calculated using the SCM visibility parameter described above. The results of these calculations are summarized in the graph of FIG. 10. The vertical coordinate of the graph is the same SCM visibility parameter used in FIG. 8. The horizontal coordinate of the graph in FIG. 10 is labeled "air haze", which requires some explanation. "Air haze" is a measure of the surface variability of the structured surface, and is directly related to the parameter $\sigma$. If we assume the structured surface 933 in FIGS. 9 and 9a has a given surface variability $\sigma$, at 100% surface coverage, the "air haze" is the amount of haze the structured surface 933 would exhibit if it were used in the exposed configuration of FIGS. 6 and 6a. By using this "air haze" as the horizontal coordinate in FIG. 10, we facilitate direct comparisons between FIG. 10 and FIG. 8. The actual haze provided by the structured surface 933 in the simulated system 910 is substantially less than its associated air haze, because the structured surface 933 is embedded between optical media whose refractive index difference is small compared to the exposed structured surface of FIG. 6.

In FIG. 10, curves 1010, 1012, 1014, 1016, 1018, and 1020 correspond to a refractive index for the light diffusing layer 930 of 1.6, 1.57, 1.54, 1.5, 1.45, and 1.4, respectively. Thus, curves 1010, 1012, 1014, 1016, 1018, and 1020 correspond to a refractive index difference between the prismatic layer 950 and the light diffusing layer 930 of 0.04, 0.07, 0.10, 0.14, 0.19, and 0.24 respectively. Superimposed on the graph of FIG. 10 is the curve 810 from FIG. 8, which can be plotted in FIG. 10 because the vertical and horizontal coordinates are compatible. At least two things are apparent from FIG. 10. First, for any given value for the refractive index of the light diffusing layer 930, increased "air haze", and hence increased surface variability $\sigma$, corresponds to decreased visibility of the SCM pattern. Second, for any given "air haze", and thus for any given surface variability σ, a greater refractive index difference between the prismatic layer 950 and the light diffusing layer 930 corresponds to decreased visibility of the SCM pattern.

A dashed line 1001 is superimposed on the data of FIG. 10. The line 1001, occurring at an SCM visibility≈0.06, marks the approximate breakpoint 1002 in the curve 810, on one side of which the SCM visibility decreases rapidly with increased haze, and on the other side of which the SCM visibility decreases more slowly. The SCM visibility at this break point, defined by line 1001, intersects the curves 1020, 1018, etc. at positions corresponding to increased surface variability (and increased air haze) as the refractive index difference on opposite sides of the structured surface 933 diminishes. The region 1003 is identified for its significance to some of the results from the film examples discussed in more detail below.

Figure 11:
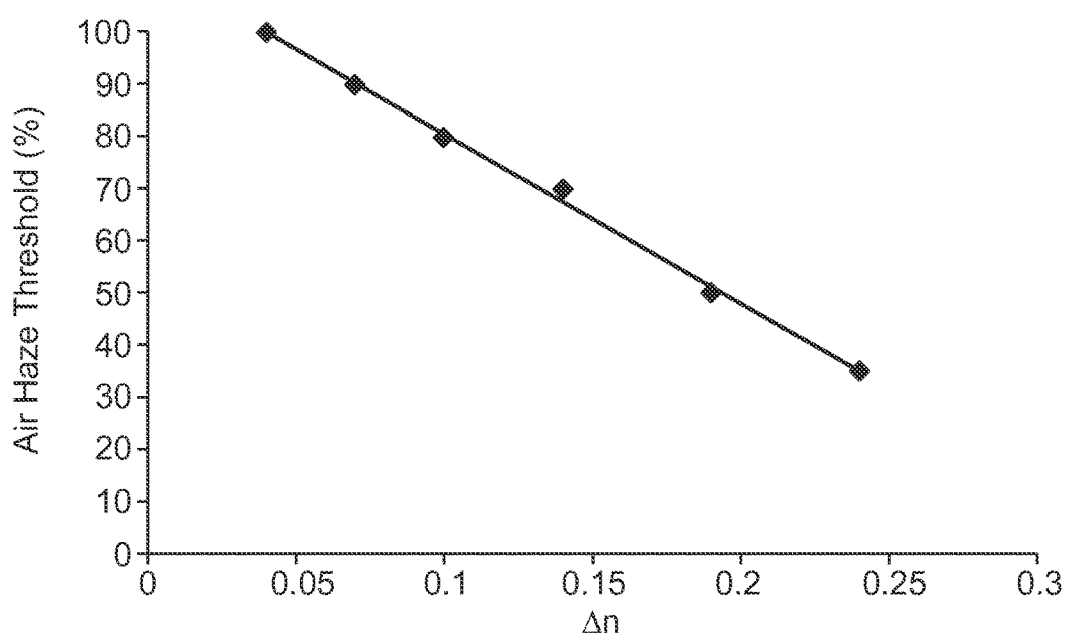
FIG. 11 is a graph, based on the results of FIG. 10, that plots how much surface variability is needed to substantially reduce the SCM pattern, expressed in terms of an air haze threshold, as a function of the refractive index difference across the embedded structured surface.

Further analysis of the data in FIG. 10 is provided in FIG. 11. FIG. 11 plots the air haze threshold, represented by the intersection of each of the curves 1020, 1018, etc. with the line 1001, as a function of Δn, i.e., the refractive index difference on opposite sides of the structured surface 933. For example, curve 1020 in FIG. 10 intersects the line 1001 at an air haze of about 35%, the curve 1020 representing a refractive index difference across the structured surface 933 of 0.24. Thus, the curve 1020 in FIG. 10 yields the data point at the extreme lower right of FIG. 11. For smaller values of Δn, a greater surface variability σ and a greater air haze threshold is required to reach the break point in SCM visibility. FIG. 11 thus confirms that as the structured surface 933 becomes less variable and more smooth, as measured by a decrease in air haze, a larger refractive index difference Δn is needed to maintain the SCM visibility at the threshold level. Interestingly, FIG. 11 also reveals that maintaining the SCM visibility for a refractive index difference less than 0.05 may not be possible by increasing the surface variability.

We have shown that the visibility of the SCM pattern can be eliminated or substantially reduced using a suitable embedded structured surface in a microreplicated film such as a brightness enhancement film. However, since a primary purpose of a brightness enhancement film is to enhance on-axis brightness of a backlight or display, it is also desirable that the embedded diffuser structure does not significantly degrade the brightness enhancement properties of the film. As explained above, the amount of brightness enhancement provided by the film is measured by the effective transmission (ET). Therefore, we also wish to investigate the effect of the embedded structured surface on the ET provided by the optical film. The simulation tools used above can also be used to investigate this issue, using the arrangement of FIG. 12.

Figure 12:
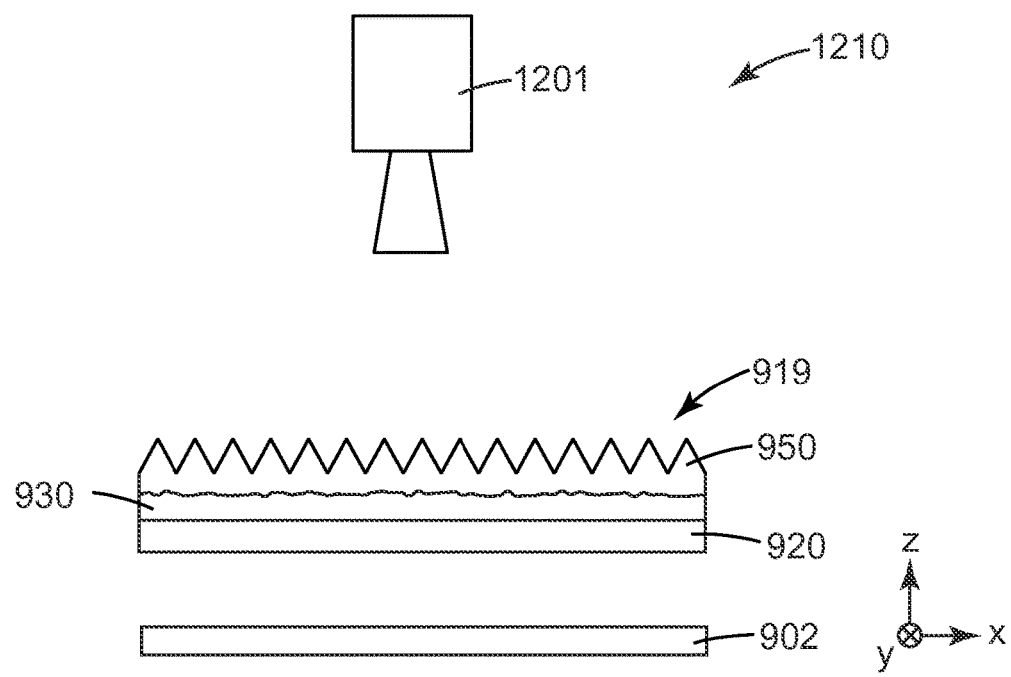

FIG. 12 depicts an optical system 1210 that may be the same as or similar to the system 910 of FIG. 9, except that the front and back polarizers 904, 906 are omitted. The system 1210 thus includes the extended light source 902 and the optical film 919 which have already been described above. The system also includes a detector 1201. The detector 1201 may be the same as or similar to detector 901 of FIG. 9. However, the detector 1201 may be used to measure ET rather than capture a conoscopic image, and hence, the detector 1201 need not detect or may ignore light propagating at significant oblique angles relative to the axial direction (e.g. the z-axis) of the optical system 1210. In order to measure the ET of the film 919, a simulation is run for the system 1210 with the film 919 in place as shown, and another simulation is run for the same system except that the film 919 is omitted. A ratio of the calculated detector outputs for these two simulations yields the ET of the film 919.

Figure 13:
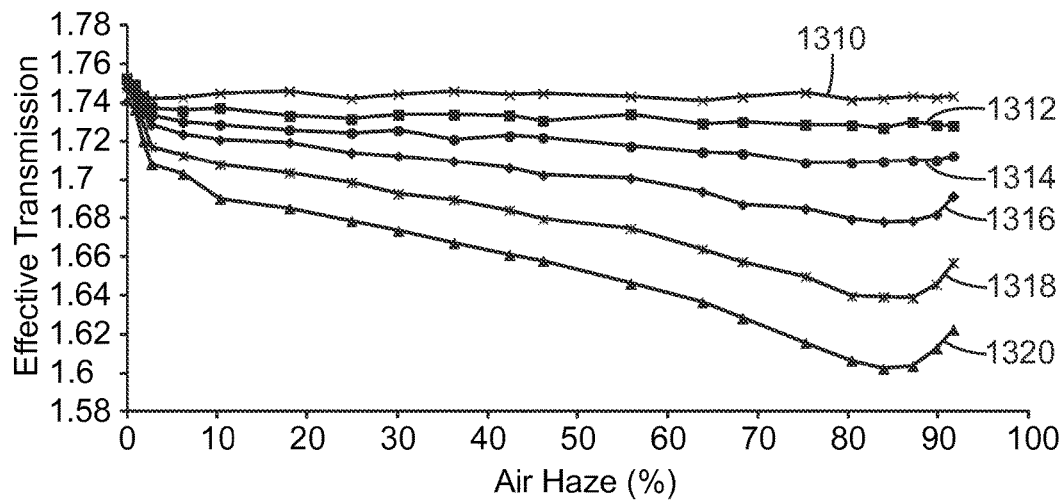
FIG. 13 is a graph, based on simulation results, of the calculated gain or effective transmission of an optical film such as that of FIG. 9a, as a function of the surface variability of the embedded structured surface, expressed in terms of air haze threshold.

Thus, for each embodiment of the film 919, with a selected refractive index for the light diffusing layer 930 and a selected surface variability σ (at 100% surface coverage), corresponding to a particular air haze, two simulations of the system 1210 were run, one with the film 919 included and one with the film 919 omitted, and the results were used to calculate the Effective Transmission (ET). The results are shown in the graph of FIG. 13. In this figure, the calculated ET is plotted against the "air haze", which is the same parameter used in FIG. 10. Curves 1310, 1312, 1314, 1316, 1318, and 1320 correspond to a refractive index for the light diffusing layer of 1.6, 1.57, 1.54, 1.5, 1.45, and 1.4, respectively. Thus, curves 1310, 1312, 1314, 1316, 1318, and 1320 correspond to a refractive index difference Δn between the prismatic layer and the light diffusing layer of 0.04, 0.07, 0.10, 0.14, 0.19, and 0.24 respectively. Inspection of FIG. 13 reveals several things. First, introduction of the embedded diffuser structure in the brightness enhancement film reduces, to at least some extent which depends on refractive index difference Δn and structured surface variability σ, the ET of the film. For most of the depicted combinations of refractive index difference and structured surface variability (or "air haze"), the reduction in ET is relatively modest, and the effectiveness of the film as a brightness enhancement film is substantially maintained. For example, the ET of at least some embodiments is at least 1.3, 1.4, 1.5, 1.6, or 1.65. Second, for any given value for the refractive index of the light diffusing layer, increased "air haze", and hence increased surface variability σ, corresponds generally to decreased ET of the film, except for very high air haze levels and large refractive index differences. Third, for any given "air haze", and thus for any given surface variability σ, a greater refractive index difference Δn between the prismatic layer and the light diffusing layer yields a greater decrease in the ET of the film.

Figure 14:
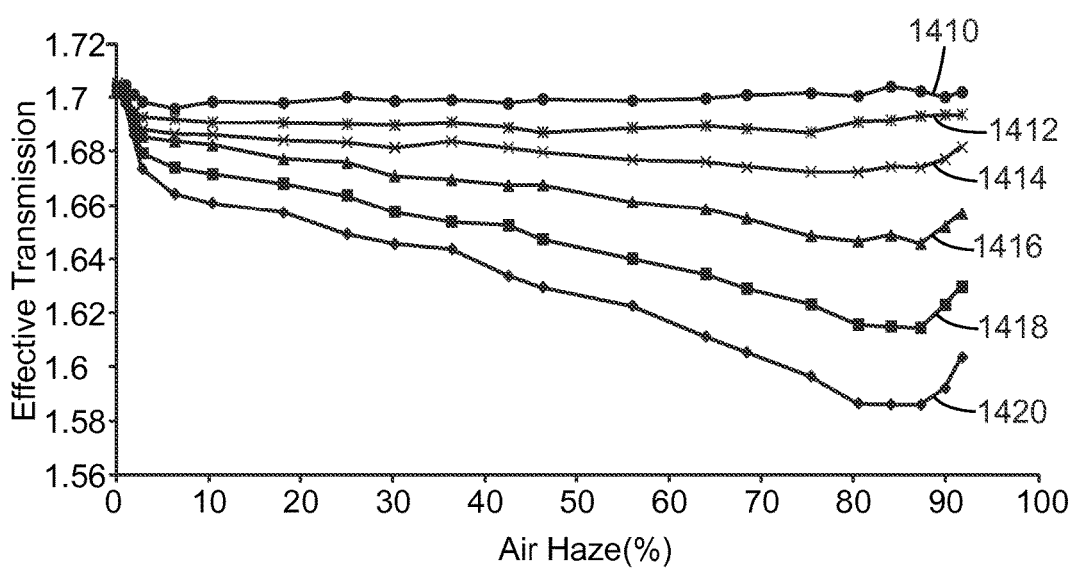
FIG. 14 is a graph, based on simulation results, similar to that of FIG. 13, but where the exposed major surface at the back or rear of the optical film was assumed to have a matte finish rather than being smooth and planar.

In many cases, the exposed major surface at the back or rear of a brightness enhancement film is provided with a matte finish, e.g. for purposes of defect hiding. In view of the presence of the embedded diffuser structure in the simulated films, it was desirable to extend our investigation to embodiments in which the back or rear-most surface of the film had a matte finish. Thus, the simulations used to create the data in FIG. 13 were rerun, except that the rearmost surface (see surface 920b in FIG. 9a) of the optical film 919 was assumed to have a matte finish rather than being smooth and planar. The matte finish assumed by the optical modeling software for the surface 920b was representative of the structured surface shown below in FIG. 19, in that it reproduced the air haze and clarity of this surface. Other than substituting the matte surface for a smooth planar surface, simulations were performed in the same way as for FIG. 13. The resulting calculated ETs for the various optical film embodiments are plotted in FIG. 14. In this figure, the ET is again plotted against the "air haze" of the embedded diffuser layer. Curves 1410, 1412, 1414, 1416, 1418, and 1420 correspond to a refractive index for the light diffusing layer of 1.6, 1.57, 1.54, 1.5, 1.45, and 1.4, respectively. Thus, curves 1410, 1412, 1414, 1416, 1418, and 1420 correspond to a refractive index difference between the prismatic layer and the light diffusing layer of 0.04, 0.07, 0.10, 0.14, 0.19, and 0.24 respectively. Comparison of FIGS. 13 and 14 reveals that the matte surface at the bottom of the optical film tends to lower the ET of the optical film, but the bottom matte surface also tends to make the ET of the optical film somewhat less sensitive to the diffusion associated with the embedded structured surface 933.

We have shown that the visibility of the SCM pattern can be eliminated or substantially reduced using a suitable embedded structured surface to provide a controlled amount of diffusion or haze in a brightness enhancement film, and that the embedded diffuser can be incorporated into the film with a relatively small decrease in the brightness enhancement properties of the film. However, in many end-use applications the brightness enhancement film may be laid atop or against a second film, layer, or object whose major surface is patterned in some fashion, and the combination of these films may give rise to an optical artifact known as "sparkle".

"Sparkle" refers to an optical artifact that appears as a grainy texture (texture mura) that consists of small regions of bright and dark luminance in what appears to be a random pattern. The position of the bright and dark regions can vary as the viewing angle changes, making the texture especially evident and objectionable to a viewer. Sparkle can appear as a result of an optical interaction between some types of non-smooth surfaces and another structure in proximity to it, the other structure referred to here as an object. In some cases the object may be a prismatic film such as a brightness enhancement film. Such a situation is illustrated in the optical stack of FIG. 15.

FIG. 15 is a schematic view of a film stack 1510 in which an optical film 1519 is laid atop or against another optical film 1569, referred to here as object 1569. The optical film 1519 has an embedded structured surface that may be tailored to introduce scattering or haze to reduce SCM visibility while maintaining high effective transmission (ET). The optical film 1519 may, if desired, have a 3-layer construction as was shown in the optical film 919 of FIG. 9a. Alternatively, the film 1519 may have a 4-layer construction as shown in FIG. 15, by the addition of another embedded layer between the prismatic layer and the birefringent substrate. The additional layer allows for more degrees of freedom in selecting the refractive indices of the materials on opposite sides of the embedded structured surface. Thus, the optical film 1519 has a prismatic layer 1550, a first light diffusing layer 1530, a second light diffusing layer 1540, and a birefringent substrate 1520 that carries the layers 1550, 1530, 1540. The optical film 1519 also has a first major surface 1519a and a second major surface 1519b. The prismatic layer 1550 may be the same as or similar to the prismatic layers of FIGS. 1, 2, and 3. The birefringent substrate 1520 may be the same as or similar to the birefringent substrates of FIG. 1, 2, 3, or 9a. For simplicity, the light diffusing layers 1530, 1540 are each assumed to have no volume scattering properties, i.e., no light scattering elements are present between the opposed major surfaces of each of these layers. However, these layers intersect or meet along an embedded structured surface 1533. The structured surface 1533 may have a Gaussian slope distribution characterized by the surface variability σ, or it may have another suitable slope distribution, such that it scatters or diffuses light.

The object 1569 is shown in the figure as a conventional brightness enhancement film, having a first major surface 1569a, a second major surface 1569b, a prismatic layer 1580, and a substrate 1570. Such a film is typically oriented in a crossed orientation relative to the upper brightness enhancement film such that the prisms of the object 1569 extend parallel to the x-direction, however, the prisms are shown otherwise in the figure for illustrative convenience.

The embedded structured surface 1533 in the optical film 1519 is shown, for generality, as a structured surface characterized by irregular undulations. Such a surface is prone to give rise to the sparkle artifact, as explained in connection with FIGS. 16a and 16b.

FIGS. 16a and 16b depict greatly magnified views of an arbitrary portion of an irregularly undulating surface 1633, which may be the same as or similar to structured surfaces 933 or 1533. The surface 1633 is assumed to extend generally parallel to the x-y plane, and is assumed to be bounded on opposite sides by a first optically transmissive medium 1630 of refractive index n1, and a second optically transmissive medium 1640 of refractive index n2. The surface portion 1633 is shown to have the identical geometry or shape in FIGS. 16a and 16b, but in FIG. 16a n1 is assumed to be greater than n2, while in FIG. 16b n1 is assumed to be less than n2. Since the surface 1633 undulates, it includes portions that curve in the negative z-direction (i.e., downwards in FIGS. 16a, 16b), and portions that curve in the positive z-direction (i.e., upwards in FIGS. 16a, 16b). In the surface portion 1633 shown in FIGS. 16a, 16b, a boundary line 1605 is drawn to identify a left subportion of the surface portion, which curves downwardly, and a right subportion of the surface portion, which curves upwardly. If we assume the prisms of the prismatic layer are disposed above the surface 1633 from the perspective of FIGS. 16a, 16b, then the left subportion of the surface portion 1633 can be said to curve away from the prisms, and the right subportion of the surface portion 1633 can be said to curve towards the prisms.

FIGS. 16a, 16b also include light rays 1603a, 1603b to demonstrate the light focusing or defocusing properties of the structured surface 1633. One can readily see that the left subportion exhibits focusing properties in FIG. 16a, while the right subportion exhibits focusing properties in FIG. 16b. The precise nature of the focusing will depend on the specific shape of the surface subportions, and on the specific values of the refractive indices n1, n2.

FIGS. 16a and 16b demonstrate that, if, in order to reduce SCM visibility, an arbitrary shaped structured surface is selected for use in optical films such as films 919 or 1519, substantial portions of the structured surface may exhibit focusing or imaging properties. For example, for some undulating embedded surfaces, about half of the plan view surface area may exhibit focusing properties, regardless of whether n1>n2 or n1<n2. Such focusing properties may, depending on focal distances, film thicknesses, and object spacing, give rise to the sparkle artifact. This is because individual areas of the embedded structured surface 1633 can act as small focusing elements that selectively image or magnify portions of a patterned surface of an object disposed behind or otherwise near the optical film 919, 1519.

Figure 17:
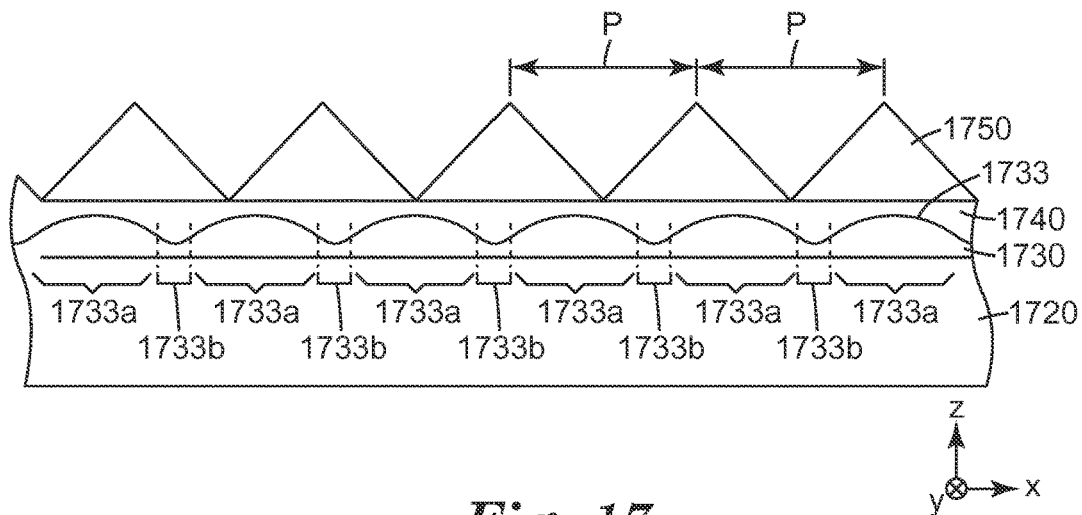
FIG. 17 is a schematic side or sectional view of a microreplicated optical film having an embedded structured surface, where the structured surface is configured to have little or no focusing or imaging properties to avoid the sparkle artifact, while still scattering or diffusing light sufficiently to substantially reduce SCM visibility.

To avoid the sparkle artifact, it is desirable to select, for use in the disclosed optical films, structured surfaces that possess little or no focusing or imaging properties, while still scattering or diffusing light by an appropriate amount to reduce SCM visibility. One example of such a structured surface is shown in FIG. 17. In FIG. 17, an optical film 1719 has a first major surface 1719a and a second major surface 1719b. The film 1719 uses a 4-layer construction similar to film 1519. Thus, the optical film 1719 has a prismatic layer 1750, a first light diffusing layer 1730, a second light diffusing layer 1740, and a birefringent substrate 1720 that carries the layers 1750, 1730, 1740. The prismatic layer 1750 may be the same as or similar to the prismatic layer 1550. The birefringent substrate 1720 may be the same as or similar to the birefringent substrate 1520. The light diffusing layers 1730, 1740 are each assumed to have no volume scattering properties, i.e., no light scattering elements are present between the opposed major surfaces of each of these layers. However, these layers intersect or meet along an embedded structured surface 1733. The structured surface 1733 may have a Gaussian slope distribution characterized by the surface variability σ, or it may have another suitable slope distribution, such that it scatters or diffuses light to reduce SCM visibility as discussed elsewhere herein.

In addition to this, the structured surface 1733 is preferably configured in such a way that a substantial majority of the surface, for example, at least 80% or at least 90% of the structured surface in plan view, does not exhibit focusing properties. One way this can be achieved is to configure the structured surface such that a substantial majority of the surface is made up of portions that curve in a same orientation, e.g., toward or away from the prisms of prismatic layer 1750. Each such curved portion of the structured surface can be referred to as a lenslet. In FIG. 17, for example, portions 1733*a* of structured surface 1733 all curve generally away from the prism layer 1750, and may be considered to be lenslets 1733*a*. In the configuration of FIG. 17, the lenslets 1733*a* will be defocusing, i.e. they will each defocus incident collimated light, if the refractive index of layer 1740 is greater than that of layer 1730. Preferably at least 80% of the structured surface 1733 is covered or occupied by the lenslets 1733*a*. A substantial minority of the structured surface 1733, e.g. the portions 1733*b*, which preferably cover or occupy less than 20% or less than 10% of the surface 1733, may be curved in such a way as to have focusing properties. Note that if the refractive index of layer 1740 is less than that of layer 1730, the structured surface 1733 is preferably reversed relative to its orientation in FIG. 17, such that the lenslets 1733 all curve towards the prisms of prismatic layer 1750.

Note that individual lenslets of a given structured surface may, when seen in plan view, be limited in transverse dimension along both principal in-plane directions. Stated differently, in contrast to an array of linear prisms, each of the lenslets may not be configured to extend indefinitely along a given in-plane direction, but rather may be limited or bounded in all in-plane directions. Bounding the lenslets in this way can ensure that they are appropriately curved, and thus defocusing, not only in one cross-sectional plane but in orthogonal cross-sectional planes.

In some cases, it may be desirable to design the optical film such that a characteristic dimension of the embedded structured surface has a predetermined relationship to a characteristic dimension of the prismatic layer. A characteristic dimension of the prismatic layer is the prism pitch P, which is labeled in FIG. 17. If the embedded structured surface comprises a plurality of lenslets, such as a regular or irregular array of closely packed lenslets, each lenslet may in at least some cases be characterized as having a largest lateral dimension D and an equivalent circular diameter "ECD". The ECD of a given lenslet may be defined as the diameter of a circle whose area in plan view is the same as the area in plan view of the lenslet. By averaging these values for all of the lenslets in the plurality of lenslets, the plurality of lenslets may then be said to have an average largest lateral dimension $D_{avg}$, and an average equivalent circular diameter $ECD_{avg}$. In some cases, the lenslets may be designed to be substantially smaller than the characteristic dimension of the prisms, such that $ECD_{avg}$ is less than the prism pitch P. In other cases, the lenslets may be designed to be about the same size as the characteristic dimension of the prisms, such that $ECD_{avg}$ is about equal to the prism pitch P.

In other cases, the lenslets may be designed to be bigger than the characteristic dimension of the prisms, such that $ECD_{avg}$ is greater than the prism pitch P. In each of these cases, it is desirable in at least some embodiments for the prisms in the prism array to all have a same orientation in transverse cross section, e.g., such that their apex angles are bisected by lines or planes that are parallel to each other. The prisms may thus have a uniform orientation even in cases where the $ECD_{avg}$ is greater than the pitch P.

Numerous design variations can be employed in the disclosed optical films, including in particular the optical films that incorporate an embedded structured surface. In addition to the particular layer arrangements shown and described in connection with the drawings, the films may include additional layers and/or coatings to provide desired optical and/or mechanical functionality. Any of the described layers may be constructed using two or more distinct sub-layers. Similarly, any two or more adjacent layers may be combined into, or replaced with, a single unitary layer. Wide varieties of prism designs, film or layer thicknesses, and refractive indices may be used. The prismatic layer can have any suitable index of refraction, e.g., in a range from about 1.4 to about 1.8, or from about 1.5 to about 1.8, or from about 1.5 to about 1.7, or not less than about 1.5, or not less than about 1.55, or not less than about 1.6, or not less than about 1.65, or not less than about 1.7. The birefringent substrate may have a typical birefringence, including an in-plane birefringence, as discussed above. In some cases, dyes, pigments, and/or particles (including scattering particles or other suitable diffusing agents) can be included in one or more of the layers or components of the optical films for desired functionality. Although polymer materials are sometimes preferred for use in the disclosed optical films for functionality and economy, other suitable materials may also be used.

Nanovoided materials, including those having an ultra low index (ULI), e.g. a refractive index of less than 1.4, or less than 1.3, or less than 1.2, or in a range from 1.15 to 1.35, may also be used in the disclosed optical films. Many such ULI materials may be described as porous materials or layers. ULI materials may be used e.g. as layer 930 in FIG. 9*a*, and layer 1540 or 1530 in FIG. 15, and layer 1730 in FIG. 17, for example. When used in combination with more common optical polymer materials that are not nanovoided, and that have substantially higher refractive indices such as greater than 1.5 or greater than 1.6, a relatively large refractive index difference Δn can be provided across the embedded structured surface. Suitable ULI materials are described e.g. in WO 2010/120864 (Hao et al.) and WO 2011/088161 (Wolk et al.), which are incorporated herein by reference.

EXAMPLES

A number of microreplicated optical films were fabricated and tested for reduction of SCM visibility and sparkle. Each of the films had a 3-layer construction as shown in FIG. 9*a*. In each case, the base or substrate film that was used was 3 mil (75 micron) thick layer of polyethylene terephthalate (PET), having substantially flat major surfaces and having significant in-plane birefringence. On one major surface of this substrate was cast and cured a first polymer material that formed a light diffusing layer. The light diffusing layer was cast against a structured surface tool so that the major surface of the light diffusing layer opposite the PET substrate was structured with a particular geometry, described below. Next, on the structured major surface of the light diffusing layer was cast and cured a second polymer material that formed a prismatic layer. The resulting construction of the films is substantially as shown schematically in FIG. 9a.

Three distinct geometries for the embedded structured surface (see surface 933 in FIG. 9a) were used. Two of the structured surface geometries utilized patterns of closely packed lenslets. The other structured surface geometry utilized an irregular pattern of flat facets.

Figure 18:
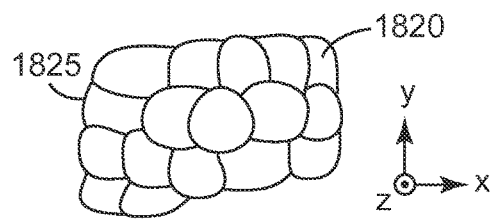
FIG. 18 is a schematic top or plan view of a structured surface having a plurality of closely packed lenslets.

The two closely packed lenslet surfaces were made in accordance with the teachings of WO 2010/141261 (Aronson et al.). This reference describes, among other things, structured surfaces such as that of FIG. 18. FIG. 18 is a schematic top-view of microstructures 1820 that form an irregular pattern in a major surface 1825. In some cases, the microstructures form a pseudo-random pattern that appears to be random. In general, the microstructures can have any height and any height distribution. In some cases, the average height (that is, the average maximum height minus the average minimum height) of the microstructures is not greater than about 5 microns, or not greater than about 4 microns, or not greater than about 3 microns, or not greater than about 2 microns, or not greater than about 1 micron, or not greater than about 0.9 microns, or not greater than about 0.8 microns, or not greater than about 0.7 microns.

Figure 19:
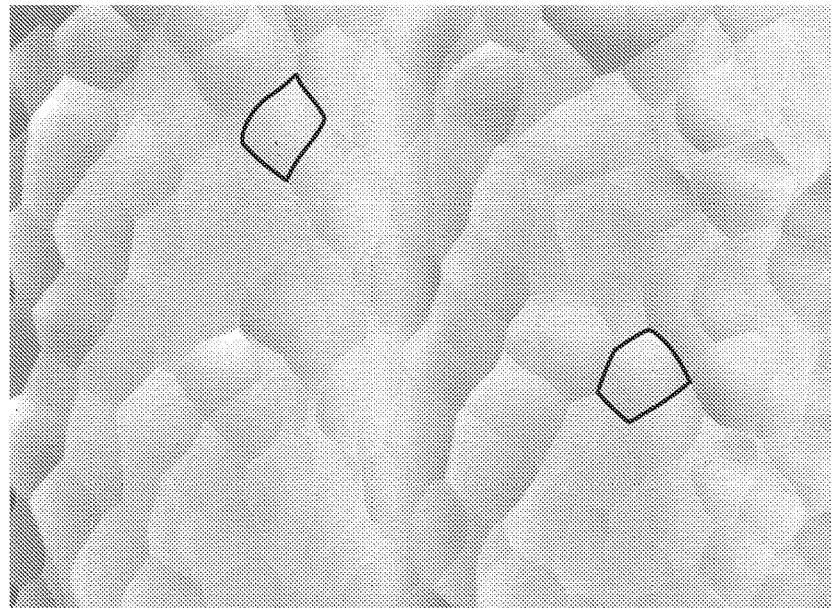
FIG. 19 is a photomicrograph of a structured surface having a plurality of closely packed lenslets.
Figure 20:
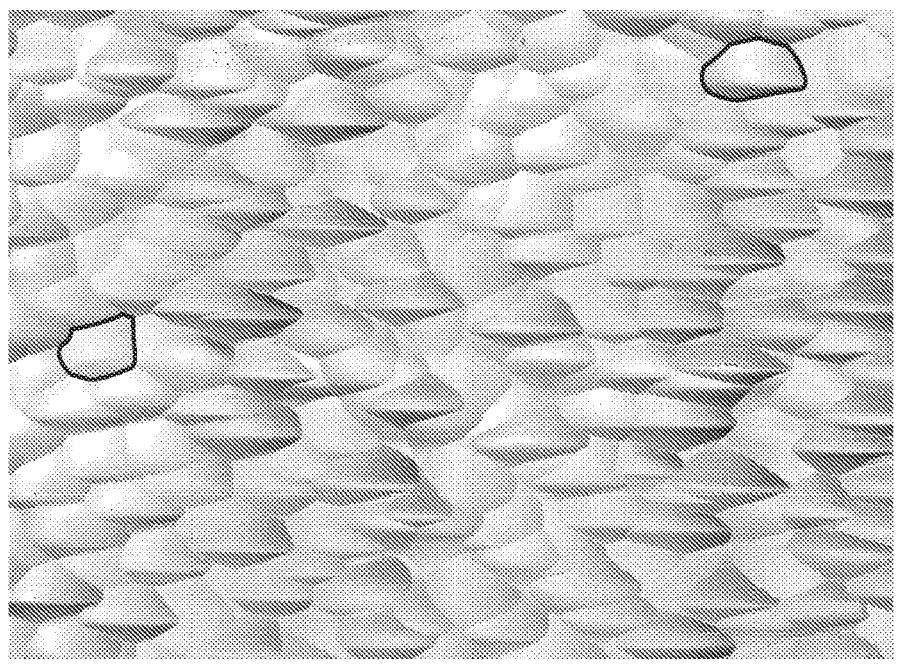
FIG. 20 is a photomicrograph of another structured surface having a plurality of closely packed lenslets.

One of the structured surfaces of closely packed lenslets is referred to here by the name "Lenslet 1". A photomicrograph of the Lenslet 1 structured surface, in top view, is shown in FIG. 19. The other of the structured surfaces of closely packed lenslets is referred to here by the name "Lenslet 2". A photomicrograph of the Lenslet 2 structured surface, in top view, is shown in FIG. 20. In FIGS. 19 and 20, reference scales are provided to show the actual in-plane dimensions of the lenslet features. Also, two of the lenslets in each of these figures are accentuated for the reader's convenience. Cartesian coordinate systems are also provided in FIGS. 19 and 20, and in each case the down-web direction of the film corresponds to the y-direction. In each of FIGS. 19 and 20, substantially all of the lenslets that are discernible in casual observation are curved in the same orientation, and more than 80%, and more than 90%, of the structured surface is made of such lenslets. In the optical film embodiments that used the Lenslet 1 and Lenslet 2 structured surfaces, the refractive index of the prismatic layer (see layer 950 of FIG. 9a) was in each case greater than the refractive index of the light diffusing layer (see layer 930 of FIG. 9a), and the lenslets were therefore oriented such that each lenslet curved away from the prisms.

Figure 21:
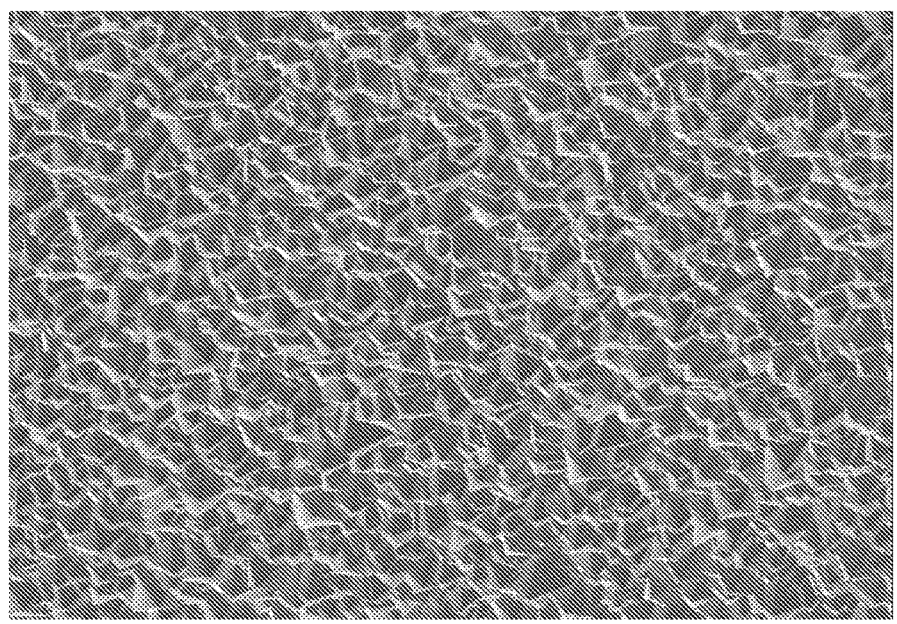
FIG. 21 is a photomicrograph of a structured surface having a plurality of randomly oriented flat facets.
Figure 21A:
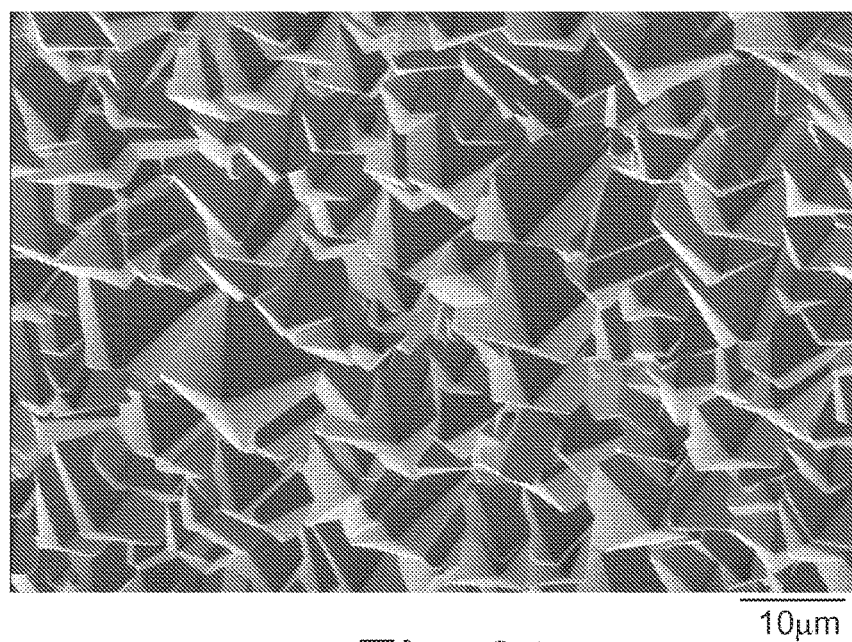
FIG. 21a is a magnified view of this structured surface.

The other embedded structured surface geometry used in the examples was an irregular flat-faceted structured surface. This structured surface, referred to here by the name "Faceted", was made in accordance with the teachings of patent application publication US 2010/0302479 (Aronson et al.). This reference describes, among other things, microstructured surfaces having randomly distributed recesses thereon and wherein the microstructured surface and the recesses are unitary. A photomicrograph of the Faceted structured surface, in top view, is shown in FIG. 21, and a photomicrograph of the same surface, at a greater magnification, is shown in FIG. 21a. In these figures, reference scales are provided to show the actual in-plane dimensions of the planar faceted features. It is apparent from FIGS. 21 and 21a that substantially the entire structured surface, e.g., greater than 80% and greater than 90% thereof, is occupied by the randomly oriented flat facets. As a result, the Faceted structured surface may be expected to have little or no focusing or imaging properties, similar to the Lenslet 1 and Lenslet 2 structured surfaces.

Figure 6B:
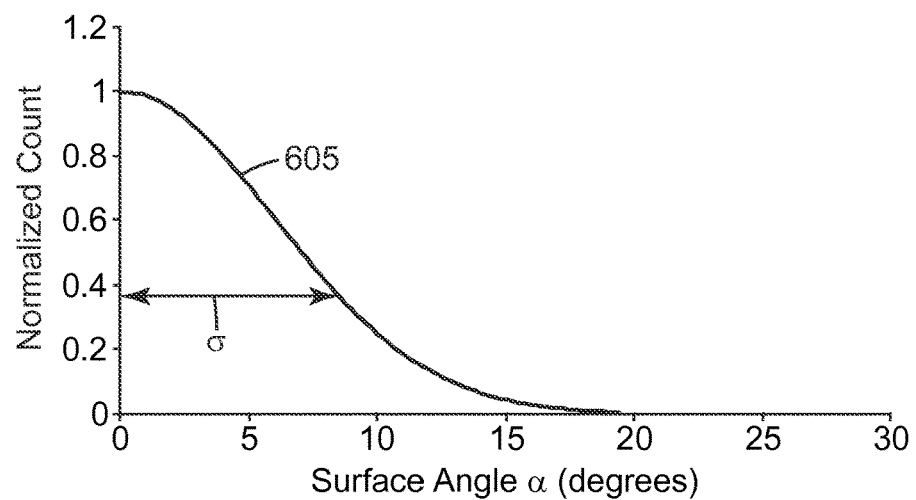
FIG. 6b is a graph illustrating a Gaussian surface angle distribution, which distribution was assumed for the structured surface of the birefringent substrate in simulations of the optical system of FIG. 6.
Figure 7A:
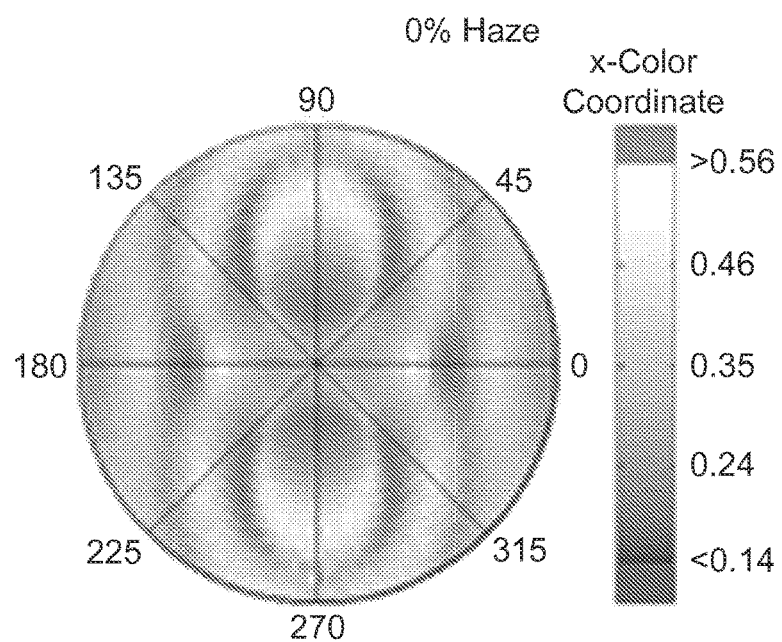
FIGS. 7a through 7e are simulated conoscopic images of the CIE x color component of the enhanced SCM pattern produced by the optical system of FIG. 6, for different amounts of surface variability of the structured surface, and hence different amounts of haze, where FIG. 7a corresponds to zero haze, FIG. 7b corresponds to 1% haze, FIG. 7c corresponds to 1.8% haze, FIG. 7d corresponds to 2.7% haze, and FIG. 7e corresponds to 6.2% haze.
Figure 7B:
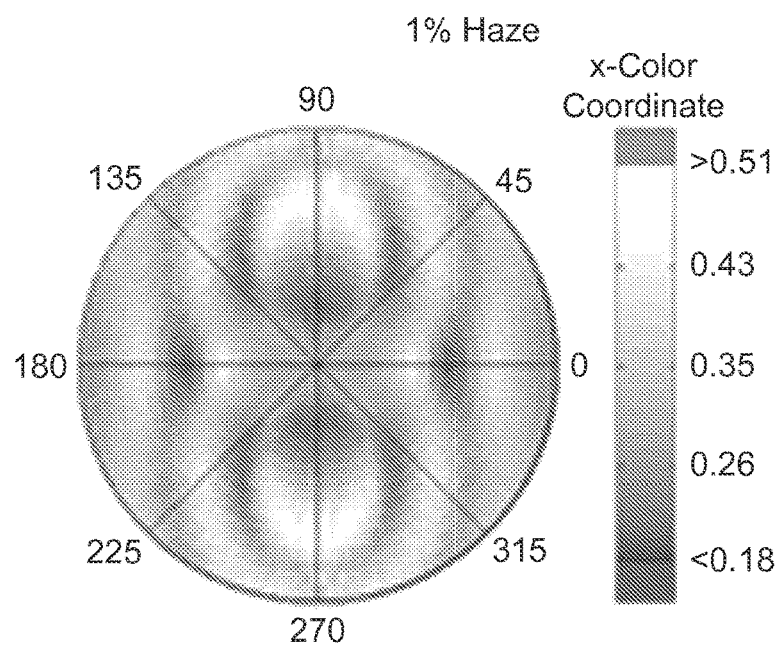
Figure 7C:
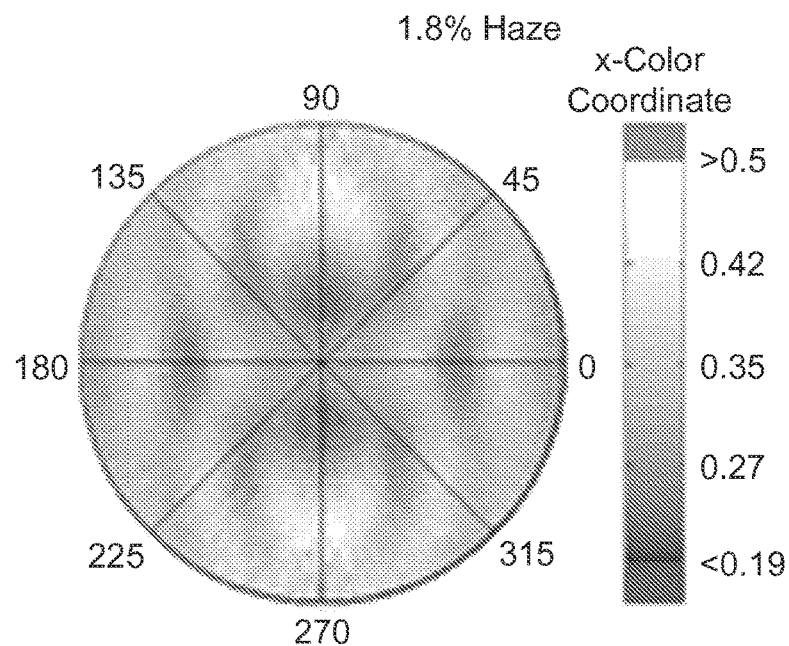
Figure 7D:
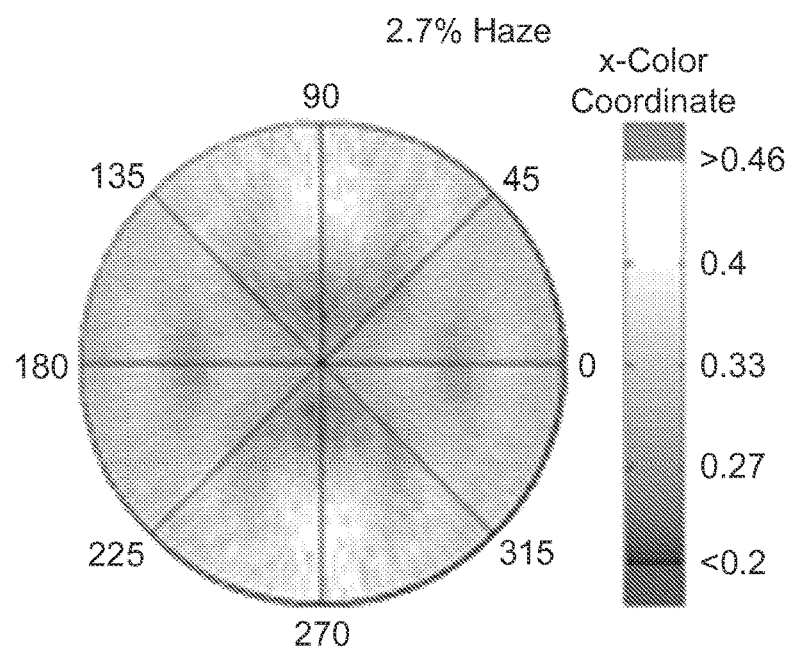
Figure 7E:
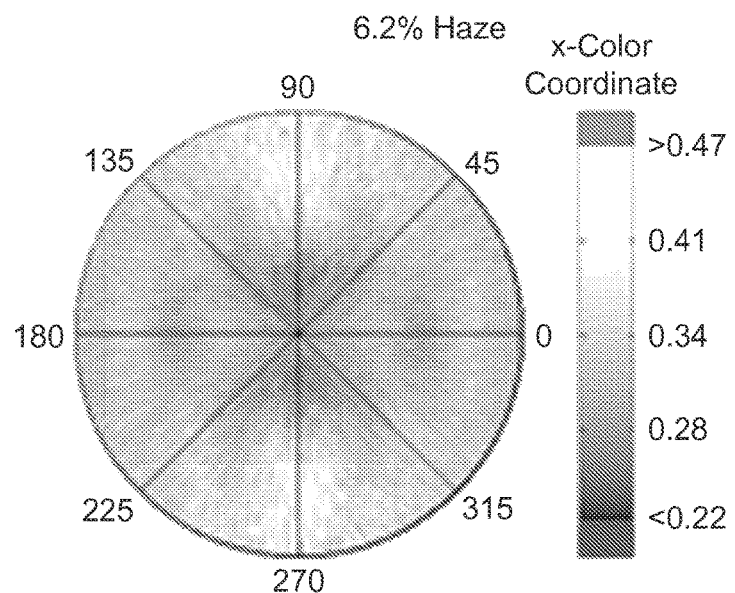
Figure 22A:
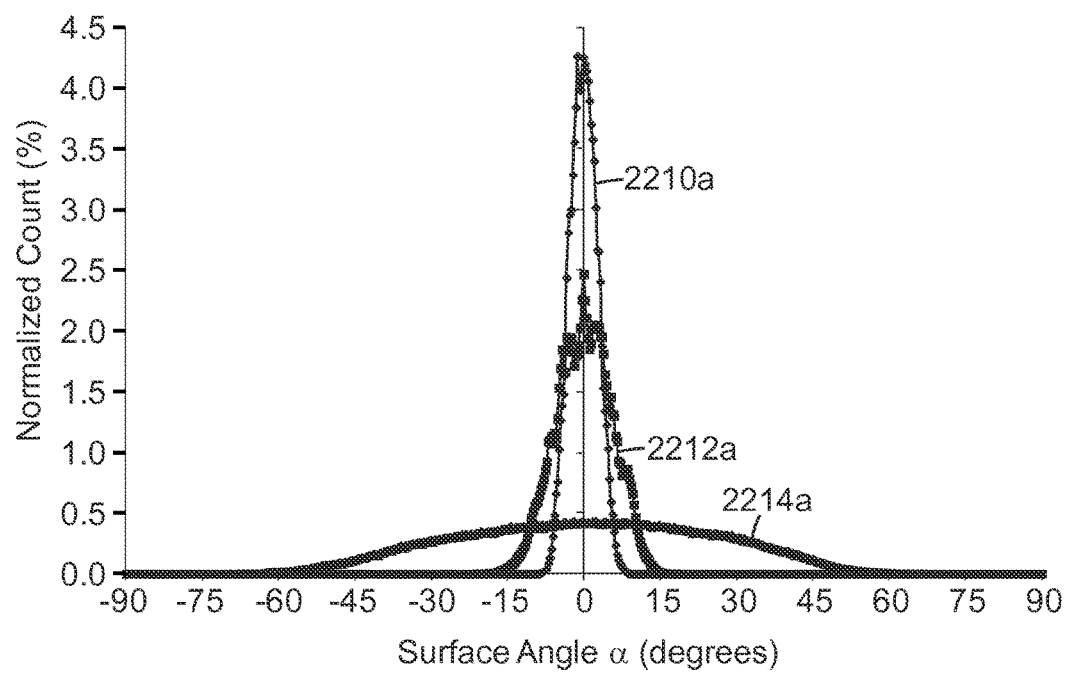
FIGS. 22a and 22b are graphs showing measured surface angle distributions, along an in-plane x-axis and along an in-plane y-axis respectively, of the structured surfaces depicted in FIGS. 19, 20, and 21.
Figure 22B:
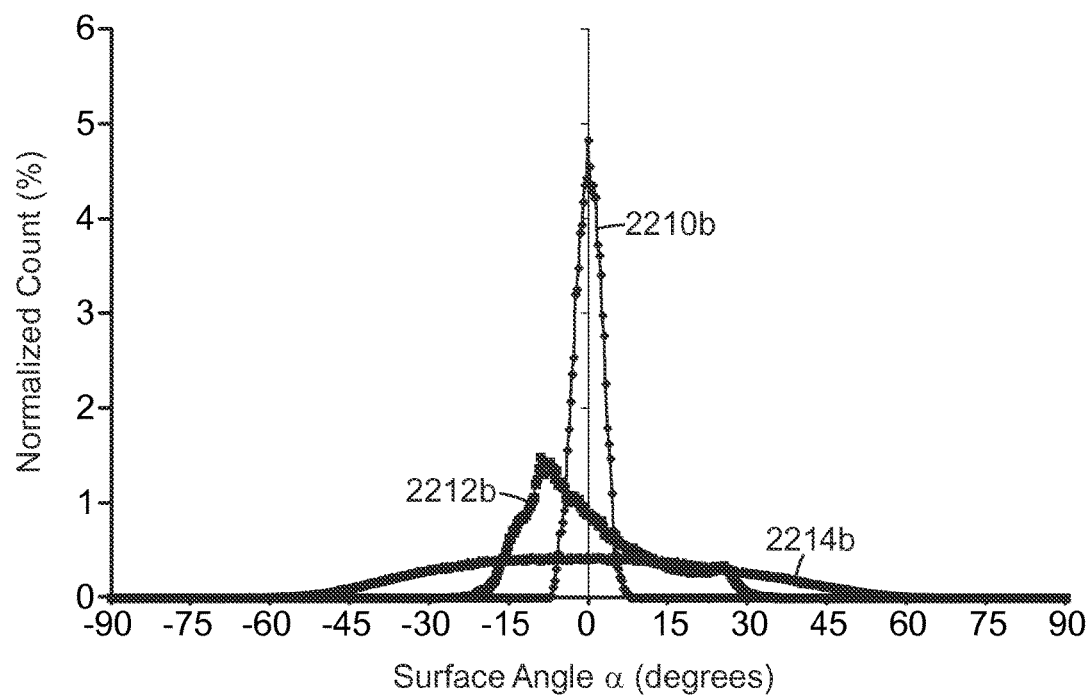

The structured surfaces of FIGS. 19, 20, and 21 were measured with a confocal microscope, and data from the confocal microscope was converted to surface angle distribution information similar to that of FIG. 6b. The results are provided in FIGS. 22a and 22b. In FIG. 22a, the surface angle distributions along one in-plane direction (x) are plotted as curves 2210a for Lenslet 1, 2212a for Lenslet 2, and 2214a for Faceted. In FIG. 22b, the surface angle distributions along an orthogonal in-plane direction (y) are plotted as curves 2210b for Lenslet 1, 2212b for Lenslet 2, and 2214b for Faceted.

In separate tests, the structured surfaces of FIGS. 19, 20, and 21 were measured for the amount of "air haze" they generate for visible light when provided on the outside of a polymer film, exposed to air. The Lenslet 1 structured surface was shown to have an air haze of 7%, the Lenslet 2 structured surface was shown to have an air haze of 70%, and the Faceted structured surface was shown to have an air haze of 100%.

As explained above, microreplicated optical films having a construction similar to FIG. 9a were made by casting onto a flat PET film a first polymer material, the casting being done with a tool having the Lenslet 1, Lenslet 2, or Faceted surface geometry defined therein. The structured surface of the first polymer material was then buried or embedded by casting a second polymer material atop the first polymer material, the second polymer material being cast against a tool that provided an outer major surface of the second polymer material with a linear prismatic structured surface. The linear prisms provided by the tool had a uniform pitch of 24 micrometers, a uniform height of 12 microns, and a uniform orientation in transverse cross-section.

The first and second polymers were selected from the following group of curable resins, each of which is adapted to provide an optical quality, high clarity, low absorption polymer layer: a polymer resin having a visible light refractive index of 1.64; a polymer resin having a visible light refractive index of 1.58; a polymer resin having a visible light refractive index of 1.56; and a polymer resin having a visible light refractive index of 1.5.

Six optical films having the Lenslet 1 geometry for the embedded structured surface were made, six optical films having the Lenslet 2 geometry for the embedded structured surface were made, and six optical films having the Faceted geometry for the embedded structured surface were made. In addition to these eighteen optical films, another optical film, referred to as "sample 0", was fabricated for reference purposes with no light scattering layer but instead had the prismatic layer cast and cured directly on the flat-surfaced PET film substrate. Each of these films was evaluated for assessment of SCM using a setup similar to that of FIG. 9, except that the lower polarizer was omitted so that a realistic SCM (rather than an enhanced SCM) could be observed, and the camera was replaced by a human observer. The human observer rated the visibility of the SCM according to a 4-level scale: "best" (i.e., best removal of the SCM), "good" (i.e., good removal of the SCM), "marginal" (i.e., marginal removal of the SCM), and "not good" (i.e., little or no removal of the SCM, such that the SCM was still visible).

In addition to assessing the optical films for SCM, an assessment for the sparkle artifact was also made. In assessing sparkle of a given optical film sample, a conventional BEF film was inserted beneath the sample film so that the sample film rested on the prism side of the conventional BEF. The front polarizer (polarizer 904 of FIG. 9) was also removed. The observer then evaluated the stack for the presence of the sparkle artifact. A rating of "not good"

indicates the observer could readily detect the sparkle artifact; a rating of "good" indicates the observer could not readily detect the sparkle artifact.

In addition to SCM and sparkle, the optical films were also measured for Effective Transmission (ET).

The results of these examples and observations are provided in the table of FIG. 23. Each of the samples exhibited an ET (not shown in the table) of greater than 1.6. The results show that microreplicated optical films can be made with a suitable embedded structured surface, e.g. having closely packed lenslets or randomly oriented substantially planar facets, and a sufficient refractive index difference, to adequately hide SCM without the sparkle artifact, and while maintaining good effective transmission. Note that sample 9, which has a refractive index difference Δn of 0.14 and an air haze of 70%, was given a "best" rating for SCM hiding. This sample can be compared to the curve 1016 in FIG. 10, which also has a refractive index difference Δn of 0.14, and crosses the threshold line 1001 in a region 1003, at an air haze of about 70%.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Following are a list of items of the present disclosure.

Item 1 is an optical film, comprising:
a birefringent substrate;
a prismatic layer carried by the substrate, the prismatic layer having a major surface comprising a plurality of side by side linear prisms extending along a same first direction; and
an embedded structured surface disposed between the substrate and the prismatic layer, the embedded structured surface comprising a plurality of defocusing lenslets, the defocusing lenslets covering at least 80% of the embedded structured surface.

Item 2 is the film of item 1, wherein the prisms have a same orientation in transverse cross section.

Item 3 is the film of item 2, wherein the prisms have a pitch P, wherein each lenslet has an equivalent circular diameter ECD, wherein the plurality of lenslets has an average equivalent circular diameter $ECD_{avg}$, and wherein $ECD_{avg}$ is greater than P.

Item 4 is the film of item 1, wherein the embedded structured surface separates two optical media that differ in refractive index by at least 0.05.

Item 5 is the film of item 1, wherein the embedded structured surface is an interface between the prismatic layer and an embedded layer, the embedded layer being disposed between the substrate and the prismatic layer.

Item 6 is the film of item 5, wherein a refractive index of the prismatic layer is greater than a refractive index of the embedded layer by at least 0.05, and wherein each of the defocusing lenslets curves away from the prismatic layer.

Item 7 is the film of item 1, wherein the embedded structured surface is an interface between a first and second embedded layer, the first and second embedded layers being disposed between the substrate and the prismatic layer.

Item 8 is the film of item 7, wherein a refractive index of the first embedded layer differs from a refractive index of the second embedded layer by at least 0.05.

Item 9 is the film of item 1, wherein the embedded structured surface is configured such that the optical film exhibits an effective transmission of no less than 1.5.

Item 10 is the film of item 1, wherein the substrate is a film of polyethylene terephthalate (PET).

Item 11 is the film of item 1, wherein the substrate comprises a major surface exposed to air, and wherein the major surface of the substrate is non-smooth.

Item 12 is a backlight comprising the film of item 1.

Item 13 is a display comprising the film of item 1.

Item 14 is an optical film, comprising:
a birefringent substrate;
a prismatic layer carried by the substrate, the prismatic layer having a major surface comprising a plurality of side by side linear prisms extending along a same first direction; and
an embedded structured surface disposed between the substrate and the prismatic layer, the embedded structured surface comprising a plurality of randomly oriented substantially planar facets, the facets covering at least 80% of the embedded structured surface.

Item 15 is the film of item 14, wherein the prisms have a same orientation in transverse cross section.

Item 16 is the film of item 14, wherein the embedded structured surface separates two optical media that differ in refractive index by at least 0.05.

Item 17 is the film of item 14, wherein the embedded structured surface is an interface between the prismatic layer and an embedded layer, the embedded layer being disposed between the substrate and the prismatic layer.

Item 18 is the film of item 17, wherein a refractive index of the prismatic layer is greater than a refractive index of the embedded layer by at least 0.05.

Item 19 is the film of item 14, wherein the embedded structured surface is an interface between a first and second embedded layer, the first and second embedded layers being disposed between the substrate and the prismatic layer.

Item 20 is the film of item 19, wherein a refractive index of the first embedded layer differs from a refractive index of the second embedded layer by at least 0.05.

Item 21 is the film of item 14, wherein the embedded structured surface is configured such that the optical film exhibits an effective transmission of no less than 1.5.

Item 22 is the film of item 14, wherein the substrate is a film of polyethylene terephthalate (PET).

Item 23 is the film of item 14, wherein the substrate comprises a major surface exposed to air, and wherein the major surface of the substrate is non-smooth.

Item 24 is a backlight comprising the film of item 14.

Item 25 is a display comprising the film of item 14.

Various modifications and alterations of this invention will be apparent to those skilled in the art without departing from the spirit and scope of this invention, and it should be understood that this invention is not limited to the illustrative embodiments set forth herein. For example, the disclosed transparent conductive articles may also include an anti-reflective coating and/or a protective hard coat. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. An optical film, comprising:
   a birefringent substrate;
   a prismatic layer carried by the substrate, the prismatic layer having a major surface comprising a plurality of side by side linear prisms extending along a same first direction; and
   an embedded structured surface disposed between the substrate and the prismatic layer, the optical film extending parallel to an x-y plane, and having a z-axis orthogonal to the x-y plane, wherein the z-axis extends in a positive z-direction from the embedded structured surface toward the prismatic layer and extends in a negative z-direction from the embedded structured surface toward the birefringent substrate,
   wherein the embedded structured surface is an interface between a first optically transmissive medium having a refractive index n1 and a second optically transmissive medium having a refractive index n2, and wherein if n1<n2 at least 80% of the embedded structured surface comprises a plurality of lenslets that curve in the negative z-direction, and wherein if n1>n2 at least 80% of the embedded structured surface comprises a plurality of lenslets that curve in the positive z-direction.

2. The film of claim 1, wherein each of the side by side linear prisms have a pitch P, wherein each of the plurality of lenslets has an equivalent circular diameter ECD, wherein the plurality of lenslets has an average equivalent circular diameter $ECD_{avg}$, and wherein $ECD_{avg}$ is greater than P.

3. The film of claim 1, wherein the refractive index n1 differs from the refractive index n2 by at least 0.05.

4. The film of claim 1, wherein the first optically transmissive medium comprises a light diffusing layer and the second optically transmissive medium comprises the prismatic layer.

5. The film of claim 4, wherein the refractive index n2 of the prismatic layer is greater than the refractive index n1 of the first optically transmissive medium by at least 0.05.

6. The film of claim 1, wherein the first optically transmissive medium is a first light diffusing layer and the second optically transmissive medium is a second light diffusing layer.

7. The film of claim 1, wherein the birefringent substrate comprises a major surface exposed to air, and wherein the major surface of the substrate is non-smooth.

* * * * *